US009622276B2

United States Patent
Li

(10) Patent No.: US 9,622,276 B2
(45) Date of Patent: Apr. 11, 2017

(54) METHOD AND DEVICE FOR DETERMINING TO ESTABLISH MULTI-PROTOCOL LABEL SWITCHING TRAFFIC ENGINEERING TUNNEL

(71) Applicant: HUAWEI TECHNOLOGIES CO., LTD., Shenzhen, Guangdong (CN)

(72) Inventor: Zhenbin Li, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 350 days.

(21) Appl. No.: 14/466,282

(22) Filed: Aug. 22, 2014

(65) Prior Publication Data

US 2014/0362846 A1    Dec. 11, 2014

Related U.S. Application Data

(63) Continuation of application No. PCT/CN2012/071597, filed on Feb. 24, 2012.

(51) Int. Cl.
*H04L 12/723* (2013.01)
*H04W 76/02* (2009.01)
(Continued)

(52) U.S. Cl.
CPC ....... *H04W 76/022* (2013.01); *H04L 12/4633* (2013.01); *H04L 45/50* (2013.01); *H04W 84/18* (2013.01)

(58) Field of Classification Search
CPC  H04W 76/022; H04W 84/18; H04L 12/4633; H04L 45/50
See application file for complete search history.

(56) References Cited

U.S. PATENT DOCUMENTS 7,746,796 B2 *  6/2010  Swallow ................ H04L 43/50
                                                        370/249
2002/0136223 A1    9/2002  Ho
(Continued)

FOREIGN PATENT DOCUMENTS

CN    101771551 A    7/2010
CN    102148745 A    8/2011
(Continued)

OTHER PUBLICATIONS

Chinese Office Action dated Jun. 2, 2015 in corresponding Chinese Patent Application No. 201280000109.4.
(Continued)

*Primary Examiner* — Ian N Moore
*Assistant Examiner* — Latresa McCallum
(74) *Attorney, Agent, or Firm* — Quarles & Brady LLP

(57) ABSTRACT

A method for determining to establish a multi-protocol label switching traffic engineering tunnel. A first PE receives an IGP notification message including information of a Mesh Group to which a second PE belongs and role information of the second PE released by the second PE. Then, it determines, according to information of Mesh Groups to which the two belong, whether the two belong to a same Mesh Group. After determining that the two belong to the same Mesh Group, the first PE determines, according to role information of the two, whether to establish the MPLS TE tunnel to the second PE.

18 Claims, 13 Drawing Sheets

(51) Int. Cl.
*H04L 12/46* (2006.01)
*H04W 84/18* (2009.01)

(56) References Cited

U.S. PATENT DOCUMENTS

| | | | | |
|---|---|---|---|---|
| 2007/0058568 A1* | 3/2007 | Previdi | ................... | H04L 45/50 370/254 |
| 2009/0144443 A1* | 6/2009 | Vasseur | ................... | H04L 45/02 709/238 |
| 2012/0294193 A1 | 11/2012 | Chen et al. | | |

FOREIGN PATENT DOCUMENTS

| | | |
|---|---|---|
| CN | 102238057 A | 11/2011 |
| CN | 102301657 A | 12/2011 |

OTHER PUBLICATIONS

PCT International Search Report issued on Dec. 13, 2012 in corresponding International Patent Application No. PCT/CN2012/071597.

Vasseur, Ed. et al., "Routing Extensions for Discovery of Multiprotocol (MPLS) Label Switch Router (LSR) Traffic Engineering (TE) Mesh Membership", Network Working Group, Standards Track, Jul. 2007, pp. 1-15.

Vasseur, Ed. et al., "IGP Routing Protocol Extensions for Discovery of Traffic Engineering Node Capabilities", Network Working Group, Standards Track, Dec. 2007, pp. 1-13.

Extended European Search Report dated May 4, 2015 in corresponding European Patent Application No. 12868977.5.

Yasukawa et al., "An Analysis of Scaling Issues in MPLS-TE Core Networks", Network Working Group, Feb. 2009, pp. 1-45.

Li et al., "Routing Extensions for Discovery of Role-based MPLS Label Switching Router (MPLS LSR) Traffic Engineering (TE) Mesh Membership draft-li-ccamp-role-based-automesh-01", Network Working Group, Oct. 2013, pp. 1-13.

Li et al., "Routing Extensions for Discovery of Role-based MPLS Label Switching Router (MPLS LSR) Traffic Engineering (TE) Mesh Membership draft-li-ccamp-role-based-automesh-02", Network Working Group, Jun. 2014, pp. 1-14.

Li et al., "Routing Extensions for Discovery of Role-based MPLS Label Switching Router (MPLS LSR) Traffic Engineering (TE) Mesh Membership draft-li-teas-role-based-automesh-00", Network Working Group, Jan. 2015, pp. 1-12.

International Search Report mailed Dec. 13, 2012, in corresponding International Patent Application No. PCT/CN2012/071597.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                        Mesh group number                      |
+-+-+-+-+-+-+-+-+-+-+-+-+-+-+-+-+-+-+-+-+-+-+-+-+-+-+-+-+-+-+-+-+
|S|H|S|B|R|L|I|E|                Reserved                       |
+-+-+-+-+-+-+-+-+-+-+-+-+-+-+-+-+-+-+-+-+-+-+-+-+-+-+-+-+-+-+-+-+
|                        Tail-end address                       |
+-+-+-+-+-+-+-+-+-+-+-+-+-+-+-+-+-+-+-+-+-+-+-+-+-+-+-+-+-+-+-+-+
|    Length     |               Tail-end name                   |
+-+-+-+-+-+-+-+-+-+-+-+-+-+-+-+-+-+-+-+-+-+-+-+-+-+-+-+-+-+-+-+-+
//                                                             //
+-+-+-+-+-+-+-+-+-+-+-+-+-+-+-+-+-+-+-+-+-+-+-+-+-+-+-+-+-+-+-+-+
|                        Mesh group number                      |
+-+-+-+-+-+-+-+-+-+-+-+-+-+-+-+-+-+-+-+-+-+-+-+-+-+-+-+-+-+-+-+-+
|S|H|S|B|R|L|I|E|                Reserved                       |
+-+-+-+-+-+-+-+-+-+-+-+-+-+-+-+-+-+-+-+-+-+-+-+-+-+-+-+-+-+-+-+-+
|                        Tail-end address                       |
+-+-+-+-+-+-+-+-+-+-+-+-+-+-+-+-+-+-+-+-+-+-+-+-+-+-+-+-+-+-+-+-+
|    Length     |               Tail-end name                   |
+-+-+-+-+-+-+-+-+-+-+-+-+-+-+-+-+-+-+-+-+-+-+-+-+-+-+-+-+-+-+-+-+
```

FIG. 9

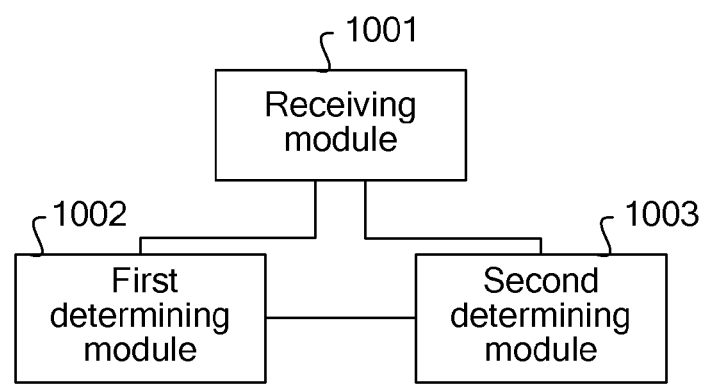

FIG. 10

METHOD AND DEVICE FOR DETERMINING TO ESTABLISH MULTI-PROTOCOL LABEL SWITCHING TRAFFIC ENGINEERING TUNNEL

CROSS-REFERENCE TO RELATED APPLICATIONS

This application is a continuation of International Application No. PCT/CN2012/071597, filed on Feb. 24, 2012, which is hereby incorporated by reference in its entirety.

FIELD OF THE INVENTION

The present invention relates to network communication technologies, and in particular, to a method and device for determining to establish a multi-protocol label switching traffic engineering tunnel.

BACKGROUND OF THE INVENTION

A 3G network architecture defined by the 3rd generation partnership project (The 3rd Generation Partnership Project, 3GPP) in a wideband code division multiple access (Wideband Code Division Multiple Access, WCDMA) R4 standard mainly includes: a radio access network (Radio Access Network, RAN), a core network (Core Network), and a bearer network (Backbone). A generalized RAN includes an air interface (Air Interface) between a terminal and a base station, namely, a Uu interface, and an Iub interface between the base station and a base station controller. For transmission and bearing, a RAN generally refers to an aggregation network between the base station and the base station controller.

With the development of a mobile network from 2G to 3G, and then to a long term evolution (Long Term Evolution, LTE) technology, a mobile communication network evolves along a broadband, packet, and flattening direction, a mobile all Internet protocol (Internet Protocol, IP) (ALL IP) network becomes an irreversible tendency. The RAN also faces a transformation tendency from a conventional time division multiplex (Time Division Multiplex, TDM)/asynchronous transfer mode (Asynchronous Transfer Mode, ATM) RAN to an IP RAN. The IP RAN based on an IP/multi-protocol label switching (Multi-Protocol Label Switching, MPLS) packet data technology has a higher bandwidth, supports statistical multiplex of a data service, can better support a future broadband mobile service, and adopt a technology that is the same as that of an IP backbone network, and is more consistent and integrated with the backbone network, therefore, the IP RAN is widely applied. The IP RAN mainly includes: an access ring of a base station side, where the access ring is formed by ATNs or another type of devices and an aggregation ring formed by CXs or another type of devices. Usually, each device on the aggregation ring may be accessed by 10 to 20 access rings. Each access ring is formed by about 10 ATNs. Generally, two high-end CXs or another type of devices are placed on the aggregation ring as gateways and are connected to the core network. The ATN or another device on the access ring is referred to as a cell site gateway (Cell Site Gateway, CSG) or a multi-service transport gateway (Multi-Service Transport Gateway, MSTG). The CX or another type of device on the aggregation ring is referred to as a radio controller site gateway (RNC Site Gateway, RSG) or a multi-service aggregation gateway (Multi-Service Aggregation Gateway, MSAG). A device located on both the access ring and the aggregation ring is a core router (Provider Router) in an MPLS virtual private network (Virtual Private Network, VPN), namely, a P device; and another device located on the access ring or the aggregation ring is a provider edge (Provider Edge, PE) in the MPLS VPN.

In an IP RAN solution, according to different service types, an end-to-end pseudo wire (PW) or a layer 3 VPN (L3VPN) may be deployed between the PE on the access ring (namely, the CSG) and the PE on the aggregation ring (namely, the RSG) for bearing. The L3VPN and the PW generally traverse the network by using an MPLS traffic engineering (Traffic Engineering, TE) tunnel. Initially, the MPLS TE tunnel adopts a static and manual configuration method, where a typical MPLS TE tunnel needs about 10 orders, and efficiency of manual configuration for the MPLS TE tunnel is low, and a configuration amount is large. Therefore, an RFC 4972 (Routing Extension for Discovery of MPLS TE Mesh Membership) of the Internet engineering task force (Internet Engineering Task Force, IETF) defines a mechanism of discovering an MPLS TE mesh member (Mesh Membership) through routing extension, which provides a method for automatically establishing the MPLS TE tunnel.

In a solution provided by the RFC 4972, a PE in the network may be defined as a member of a specific mesh group (Mesh Group) (a device may belong to multiple Mesh Groups), and releases information of the Mesh Group to which the device belongs through an interior gateway protocol (Interior Gateway Protocol, IGP), and in this way, the device may discover a member of the MPLS TE network through the IGP, and an MPLS TE tunnel is established between member devices belonging to the same Mesh Group, so as to form a full mesh (Full Mesh) connection. Based on the foregoing description, in an IP RAN scenario, different PEs on the access ring and on the aggregation ring may be divided into a corresponding Mesh Group, a node of the MPLS TE network is automatically discovered through an IGP notification, and an MPLS TE tunnel establishment is automatically initiated, thereby alleviating the configuration amount of MPLS TE, and improving the configuration efficiency.

However, because the solution provided by the RFC 4972 is only applicable to establishment of the full mesh connection, in this way, an MPLS TE tunnel is also established between two PEs on the access ring (namely, two CSGs) which belong to the same Mesh Group. Actually, the mobile service is connected from the base station to the base station controller, that is, it is only needed to establish an MPLS TE tunnel between a PE on the access ring and a PE on the aggregation ring, but not needed to establish an MPLS TE tunnel between PEs on the access ring. Therefore, the RFC 4972 solution has a limitation in use.

SUMMARY OF THE INVENTION

Embodiments of the present invention provide a method and device for establishing a multi-protocol label switching traffic engineering tunnel, which are used for establishing the MPLS TE tunnel, by using a Mesh Group solution, between PEs that need to establish the MPLS TE tunnel, and ensures that an unnecessary MPLS TE tunnel is not established, and overcomes a limitation in establishing the MPLS TE tunnel by using the Mesh Group solution.

An embodiment of the present invention provides a method for establishing a multi-protocol label switching traffic engineering MPLS TE tunnel, including:

receiving, by a first provider edge PE, an interior gateway protocol IGP notification message released by a second PE in a network, where the IGP notification message includes information of a mesh group Mesh Group to which the second PE belongs and role information of the second PE in a network service, and the role information of the second PE in the network service is obtained by division according to an application scenario of the network service;

determining, by the first PE, according to information of a Mesh Group to which the first PE belongs and the information of the Mesh Group to which the second PE belongs, whether the first PE and the second device belong to a same Mesh Group; and determining, by the first PE, after determining that the first PE and the second PE belong to the same Mesh Group, according to role information of the first PE in the network service and the role information of the second PE in the network service, whether to establish the MPLS TE tunnel to the second PE, where the role information of the first PE in the network service is obtained by division according to the application scenario of the network service.

An embodiment of the present invention provides a device for establishing a multi-protocol label switching traffic engineering MPLS TE tunnel, including:

a receiving module, configured to receive an interior gateway protocol IGP notification message released by a second device for determining to establish an MPLS TE tunnel in a network, where the IGP notification message includes information of a mesh group Mesh Group to which the second device for determining to establish the MPLS TE tunnel belongs and role information of the second device for determining to establish the MPLS TE tunnel, where the role information is in a network service, and the role information of the second device for determining to establish the MPLS TE tunnel, where the role information is in the network service, is obtained by division according to an application scenario of the network service;

a first determining module, configured to determine, according to information of a Mesh Group to which the device for determining to establish the MPLS TE tunnel belongs and the information of the Mesh Group to which the second device for determining to establish the MPLS TE tunnel belongs, whether the device for determining to establish the MPLS TE tunnel and the second device for determining to establish the MPLS TE tunnel belong to a same Mesh Group; and a second determining module, configured to determine, after the first determining module determines that the device for determining to establish the MPLS TE tunnel and the second device for determining to establish the MPLS TE tunnel belong to the same Mesh Group, according to role information of the device for determining to establish the MPLS TE tunnel, where the role information is in the network service, and the role information of the second device for determining to establish the MPLS TE tunnel, where the role information is in the network service, whether to establish the MPLS TE tunnel to the second device for determining to establish the MPLS TE tunnel, where the role information of the device for determining to establish the MPLS TE tunnel, where the role information is in the network service, is obtained by division according to the application scenario of the network service.

According to the method and device for establishing the multi-protocol label switching traffic engineering tunnel provided in the embodiments of the present invention, each PE in the network releases a Mesh Group to which it belong through the IGP notification message, and releases its role information in the network service at the same time, and each PE determines whether to establish the MPLS TE tunnel with another PE belonging to the same Mesh Group with it according to its role information and the role information of the another PE belonging to the same Mesh Group with it, which does not establish the MPLS TE tunnel according to only a condition about whether they belong to the same Mesh Group as in the prior art, avoids establishing the unnecessary MPLS TE tunnel, and overcomes the limitation in establishing the MPLS TE tunnel by using the Mesh Group solution.

BRIEF DESCRIPTION OF THE DRAWINGS

To illustrate the technical solutions in the embodiments of the present invention or in the prior art more clearly, the following briefly describes accompanying drawings needed for describing the embodiments or the prior art. Obviously, the accompanying drawings in the following description are some embodiments of the present invention, and persons of ordinary skill in the art may other accompanying drawings from these accompanying drawings without making creative efforts.

FIG. 9 is a schematic structural diagram of an IGP notification message according to an embodiment of the present invention;

FIG. 10 is a schematic structural diagram of a device for determining to establish an MPLS TE tunnel according to an embodiment of the present invention.

DETAILED DESCRIPTION OF THE EMBODIMENTS

To make the objectives, technical solutions, and advantages of the embodiments of the present invention more clear, the following clearly and completely describes the technical solutions according to the embodiments of the present invention with reference to the accompanying drawings in the embodiments of the present invention. Obviously, the embodiments in the following description are merely part of rather than all of the embodiments of the present invention. All other embodiments obtained by persons of ordinary skill in the art based on the embodiments of the present invention without making creative efforts shall fall within the protection scope of the present invention.

Figure 1:
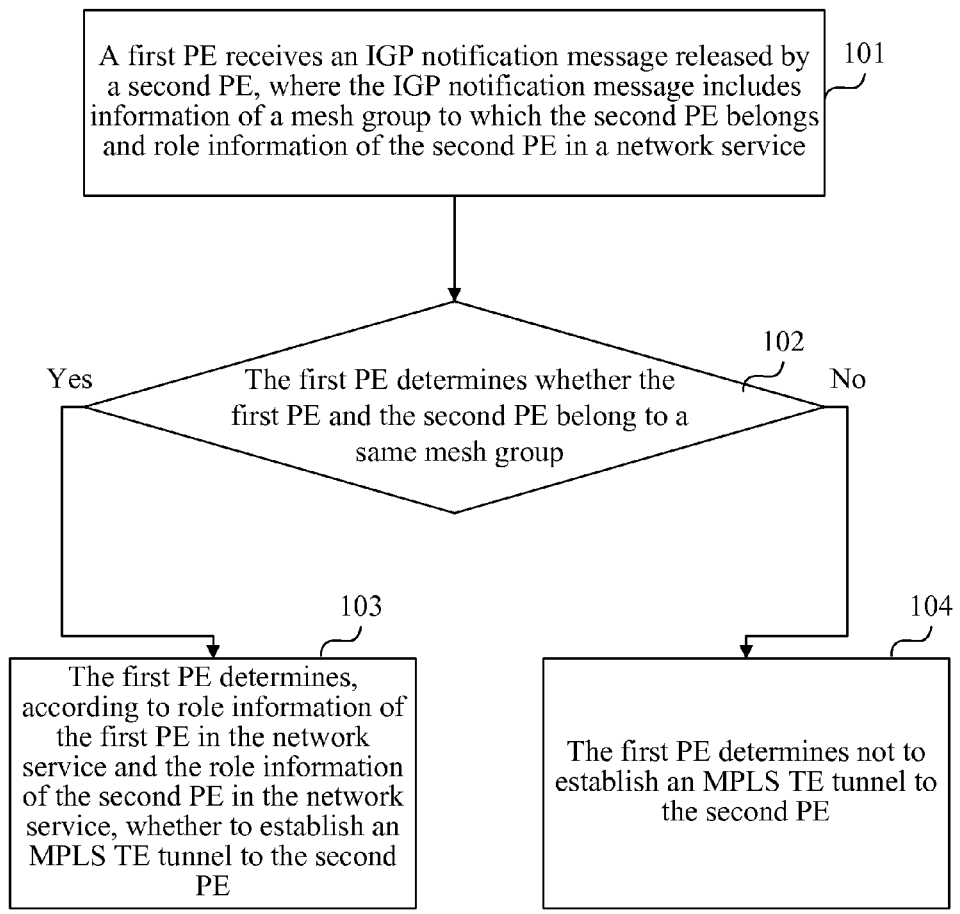
FIG. 1 is a flow chart of a method for determining to establish an MPLS TE tunnel according to an embodiment of the present invention.

FIG. 1 is a flow chart of a method for determining to establish an MPLS TE tunnel according to an embodiment of the present invention. As shown in FIG. 1, the method of this embodiment includes:

Step 101: A first PE receives an IGP notification message released by a second PE, where the IGP notification message includes information of a mesh group (Mesh Group) to which the second PE belongs and role information of the second PE in a network service.

Embodiments of the present invention are applicable to various networks supporting an MPLS VPN. A network in this embodiment may be an IP RAN in a 3G network architecture defined by 3GPP in a WCDMA R4 standard, but is not limited here. For example, if a core network in the 3G network architecture defined by 3GPP in the WCDMA R4 standard also supports the MPLS VPN, the network in this embodiment may further be the core network.

In the embodiments of the present invention, role information of the first PE or the role information of the second PE in the network service is obtained by division according to an application scenario of the network service. That is to say, a role of each PE in the MPLS VPN network is divided according to the application scenario of the network service. The application scenario of the network service includes a hub-spoke (Hub-Spoke) scenario, a P2MP MPLS scenario, a unidirectional MPLS scenario, an inter-domain MPLS TE scenario and so on. The Hub-Spoke scenario is particularly applicable to the IP RAN network implemented based on an MPLS technology, but is not limited here. In the Hub-Spoke scenario, the role information of the PE includes a Hub node and a Spoke node, and it only needs to establish an MPLS TE tunnel from a Hub node to a Spoke node or from a Spoke node to a Hub node. In the Hub-Spoke scenario, the role information of the first PE in the network service may be the Hub node or the Spoke node, and the role information of the second PE in the network service may also be the Hub node or the Spoke node. The P2MP MPLS scenario refers to a scenario where a PE needs to establish the MPLS TE tunnel with multiple PEs. In the P2MP MPLS scenario, the role information of the PE includes a root node and a leaf node; and the root node needs to establish one P2MP MPLS TE tunnel with multiple leaf nodes. In the P2MP MPLS scenario, the role information of the first PE in the network service may be a root node or a leaf node, and the role information of the second PE in the network service may also be the root node or the leaf node. The unidirectional MPLS scenario refers to a scenario where the MPLS TE tunnel can only be established from a PE to another PE, and the MPLS TE tunnel cannot be established in a reverse direction. In the unidirectional MPLS scenario, the role information of the PE includes an ingress node and an egress node; and the MPLS TE tunnel can only be established in a direction from the ingress node to the egress node. In the unidirectional MPLS scenario, the role information of the first PE in the network service may be the ingress node or the egress node, and the role information of the second PE in the network service may also be the ingress node or the egress node. The inter-domain MPLS TE scenario refers to that network division needs to be performed by using an IGP multi-process or multi-area technology, that is, each PE belongs to a different IGP process or area. Taking the IP RAN network as an example, PEs on an access ring and an aggregation ring belong to different IP processes or areas. In the inter-domain MPLS TE scenario, the role information of the PE may be an inter-domain border node (Border) in addition to the Hub node or the Spoke node, that is, the border node is located on two IGP processes or areas. The inter-domain MPLS TE scenario may further be combined with the P2MP MPLS scenario, the unidirectional MPLS scenario and so on, and at this time the role information of the PE may further include the inter-domain border node in addition to including the root node and the leaf node, or in addition to including the ingress node and the egress node. Moreover, the inter-domain border node may further be a P device in addition to the PE.

In this embodiment, the MPLS TE tunnel establishment is described by taking a PE (namely, the first PE) in the network as an example. For any one PE in the network, a procedure of the MPLS TE tunnel establishment of the PE is the same as that of the first PE, and therefore is not repeatedly described. In this embodiment, the second PE refers to another PE in the network except the first PE. In different application scenarios of the network service, the number of second PEs may be different.

In a practical application, each PE in the network belongs to a Mesh Group, and releases information of the Mesh Group to which it belongs through an IGP notification message. In this embodiment, when releasing the information of the Mesh Group to which it belongs, each PE further releases its role information in the network service at the same time. In addition, each PE in the network further receives an IGP notification message released by another PE, so as to obtain information of a Mesh Group to which the another PE belongs and role information of the another PE in the network service.

The first PE further receives the IGP notification message sent by the second PE in the network, in addition to releasing information of a Mesh Group to which the first PE belongs and the role information of the first PE in the network service in the network through the IGP notification message. The second PE also receives an IGP notification message that is released by the first PE and includes the information of the Mesh Group to which the first PE belongs and the role information of the first PE in the network service, and after determining that the first PE and the second PE belong to the same Mesh Group according to the information of the Mesh Group to which the first PE belongs and the information of the Mesh Group to which the second PE belongs, determines, according to the role information of the first PE in the network service and the role information of the second PE in the network service, whether to establish the MPLS TE tunnel to the first PE.

Optionally, before the first PE releases the IGP notification message to another PE in the network, or before the first PE receives the IGP notification message released by the another PE, for example, the second PE, the information of the Mesh Group to which the first PE belongs and the role information of the PE in the network service may be configured for the first PE according to the application scenario of the network service. Similarly, for the another PE, the information of the Mesh Group to which the another PE belongs and the role information of the another PE in the network service may also be configured for the another PE according to the application scenario of the network service.

Step 102: The first PE determines, according to the information of the Mesh Group to which the first PE belongs and the information of the Mesh Group to which the second PE belongs, whether the first PE and the second PE belong to the same Mesh Group; if a judgment result is yes, that is, the first PE determines that the first PE and the second PE belong to the same Mesh Group, execute step 103; and optionally, if a judgment result is no, that is, the first PE determines that the first PE and the second PE do not belong to the same Mesh Group, execute step 104.

In this embodiment, after receiving the IGP notification message of the second PE, the first PE parses the IGP notification message of the second PE, so as to obtain the information of the Mesh Group to which the second PE belongs and the role information of the second PE in the network service. Next, the first PE determines according to the information of the Mesh Groups to which the first PE and the second PE belong, whether the first PE and the second PE belong to the same Mesh Group. For example, the first PE may judge whether the information of the Mesh Group to which the first PE belongs is the same as the information of the Mesh Group to which the second PE belongs; if a judgment result is that it is the same, the first PE determines that the first PE and the second PE belong the same Mesh Group; and otherwise, the first PE determines the first PE and the second PE belong to different Mesh Groups.

The information of the Mesh Group may be any information that may uniquely indicate a Mesh Group such as a number, a name, and so on, of the Mesh Group.

Optionally, the IGP notification message released by the second PE may further include information about whether the Mesh Group to which the second PE belongs is a shared Mesh Group.

Based on the shared Mesh Group, that the first PE determines, according to the information of the Mesh Group to which the first PE belongs and the information of the Mesh Group to which the second PE belongs, whether the first PE and the second PE belong to the same Mesh Group includes:

If the information of the Mesh Group to which the first PE belongs is the same as the information of the Mesh Group to which the second PE belongs, the first PE determines that the first PE and the second PE belong to the same Mesh Group.

If the information of the Mesh Group to which the first PE belongs is different from the information of the Mesh Group to which the second PE belongs, but the Mesh Group to which the first PE belongs and/or the Mesh Group to which the second PE belongs is a shared Mesh Group, the first PE determines that the first PE and the second PE belong to the same Mesh Group. For example, the information of the Mesh Group to which the first PE belongs is a Mesh Group 1, and the information of the Mesh Group to which the second PE belongs is a Mesh Group 2, but the Mesh Group to which the first PE or the second PE belongs is the shared Mesh Group. At this time, although the information of the Mesh Group to which the first PE belongs is different from the information of the Mesh Group to which the second PE belongs, because at least one shared Mesh Group exists, the first PE still determines that the first PE and the second PE belong to the same Mesh Group.

If the information of the Mesh Group to which the first PE belongs is different from the information of the Mesh Group to which the second PE belongs, and neither the Mesh Group to which the first PE belongs nor the Mesh Group to which the second PE belongs is the shared Mesh Group, the first PE determines that the first PE and the second PE do not belong to the same Mesh Group.

Step 103: The first PE determines, according to the role information of the first PE in the network service and the role information of the second PE in the network service, whether to establish the MPLS TE tunnel to the second PE.

In this embodiment, after judging that the first PE and the second PE belong to the same Mesh Group, the first PE does not directly determine that the MPLS TE tunnel needs to be established with the second PE as in the prior art, but further determines, according to the role information of the first PE and the role information of the second PE, whether the first PE needs to establish the MPLS TE tunnel to the second PE, so as to avoid establishing an unnecessary MPLS TE tunnel.

For example, take the IP RAN network as an example. Role information of a CSG in the IP RAN network may be seen as a Spoke node in the Hue-Spoke scenario, while role information of an RSG may be seen as a Hub node. If both roles of the first PE and the second PE are Hub nodes, or both roles of the first PE and the second PE are Spoke nodes, the MPLS TE tunnel does not need to be established between the first PE and the second PE, therefore, the first PE determines not to establish the MPLS TE tunnel to the second PE; and in another case, the first PE determines to establish the MPLS TE tunnel to the second PE. In other words, in the Hue-Spoke scenario, after determining that the role information of the first PE is different from the role information of the second PE, the first PE determines to establish the MPLS TE tunnel to the second PE; and after determining that the role information of the first PE is the same as the role information of the second PE, the first PE determines not to establish the MPLS TE tunnel to the second PE, that is, the MPLS TE tunnel is not established between a CSG and another CSG, or between an RSG and another RSG, and the MPLS TE tunnel is only established between a CSG and an RSG.

For further example, take the P2MP MPLS scenario as an example. After the first PE determines that the role information of the first PE in the network service is a leaf node, or determines that the role information of both the first PE and the second PE in the network service is a root node, the P2MP MPLS TE tunnel does not need to be established between the first PE and the second PE, therefore, the first PE determines not to establish the P2MP MPLS TE tunnel to the second PE; and in another case, that is, after the first PE determines that the role information of the first PE in the network service is a root node, and the role information of the second PE in the network service is a leaf node, the first PE determines to establish the MPLS TE tunnel to the second PE. In the scenario, there are multiple second PEs, so as to form P2MP.

For further example, take the unidirectional MPLS scenario as an example. After determining that the role information of the first PE in the network service is an ingress node, and the role information of the second PE in the network service is an egress node, the first PE determines to establish the MPLS TE tunnel to the second PE; and after determining that the role information of the first PE in the network service is an egress node, or determining that the role information of both the first PE and the second PE in the network service is an ingress node, the first PE determines not to establish the MPLS TE tunnel to the second PE.

Step 104: The first PE determines not to establish the MPLS TE tunnel to the second PE.

When the first PE judges that the first PE and the second PE do not belong to the same Mesh Group (that is, belong to different Mesh Groups), the MPLS TE tunnel cannot be established between the first PE and the second PE, therefore, the first PE determines not to establish the MPLS TE tunnel to the second PE.

In this embodiment, when releasing the information of the Mesh Group to which it belongs, each PE in the network releases its role information in the network service at the same time, each PE determines, according to the information of the Mesh Groups to which it and another PE belong and the role information of it and the another PE in the network service, whether to establish the MPLS TE tunnel to the another PE, which ensures that the MPLS TE tunnel is established between the PEs needing to establish the MPLS TE tunnel, and the MPLS TE tunnel is not established between the PEs that do not need to establish the MPLS TE tunnel, overcomes a limitation in establishing the MPLS TE tunnel by using a Mesh Group solution, and saves a resource consumed due to establishing the unnecessary MPLS TE tunnel.

Figure 2:
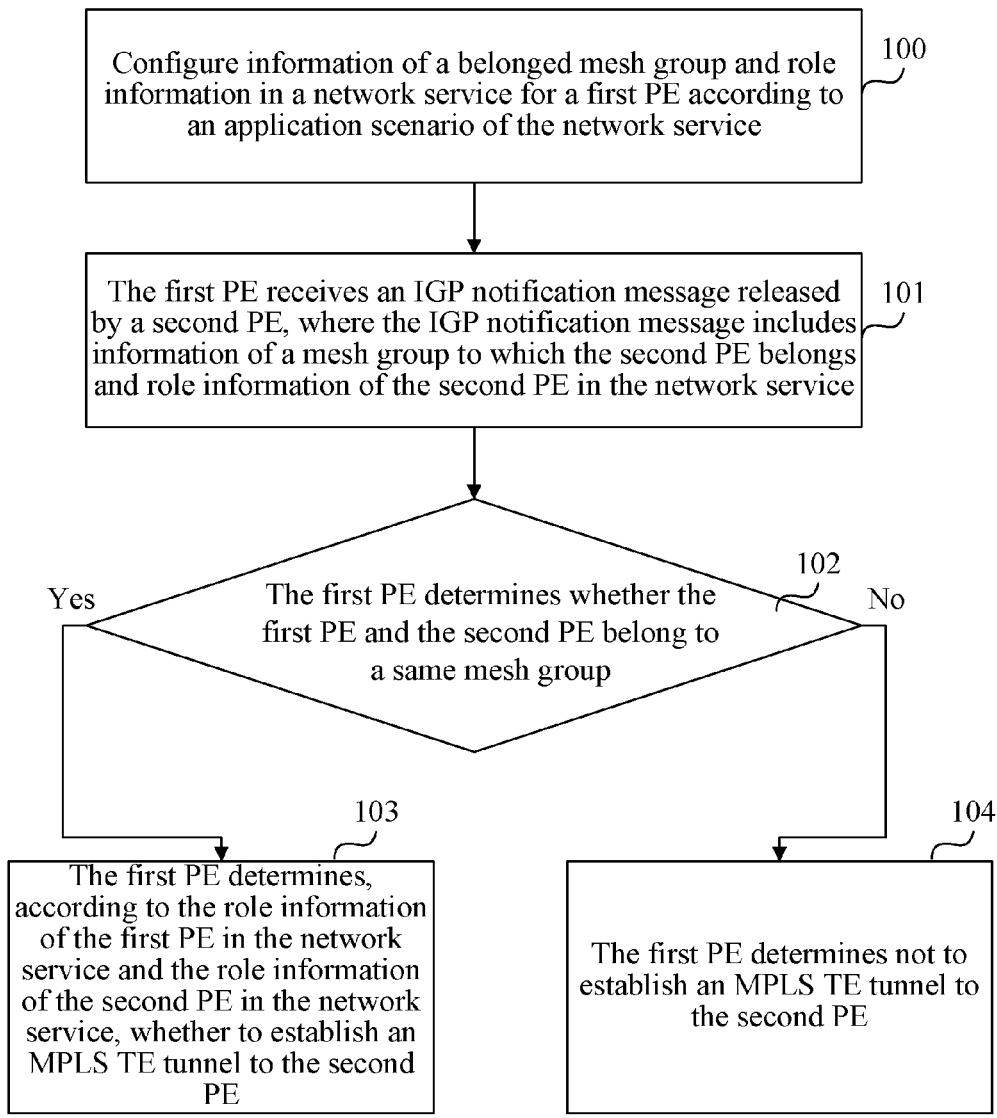
FIG. 2 is a flow chart of a method for determining to establish an MPLS TE tunnel according to another embodiment of the present invention.

FIG. 2 is a flow chart of a method for determining to establish an MPLS TE tunnel according to another embodiment of the present invention. This embodiment is implemented based on the embodiment shown in FIG. 1, and as shown in FIG. 2, the method in this embodiment, before step 101, includes:

Step 100: Configure information of a belonged Mesh Group and role information in a network service for a first PE according to an application scenario of the network service.

The step 100 is used for pre-configuring the Mesh Group to which the first PE belongs and the role information of each PE in the network service. The configuration operation may be manually executed, and may also be that the first PE automatically configures, under control of a management device, the Mesh Group to which the first PE belongs and a role of the first PE in the network service. For another PE, information of a Mesh Group to which each PE belongs and its role information in the network service also need to be pre-configured.

For each PE (including the first PE) in the network, the Mesh Group to which each PE belongs and the role information of each PE in the network service may be configured according to a service category. For example, bind an L3VPN service with a Mesh Group, that is, all PEs supporting the L3VPN service belong to a same Mesh Group, and configure role information of each PE supporting the L3VPN service when each PE supports the L3VPN service; and bind an L2VPN service with another Mesh Group, that is, all PEs supporting the L2VPN service belong to a same Mesh Group, and configure role information of each PE supporting the L2VPN service when each PE supports the L2VPN service.

Take the several related application scenarios in step 101 as examples: If the application scenario of the network is a hub-Spoke scenario, configure the role information of the first PE as a Hub node or a Spoke node; and configure the role information of the second PE as a Hub node or a Spoke node. For example, taking an IP RAN network as an example, it is needed to configure role information of a CSG as a Spoke node, and configure role information of an RSG as a Hub node. The first PE may be the CSG or RSG, and the second PE may also be the CSG or RSG. If the application scenario of the network service is a P2MP MPLS scenario, configure the role information of the first PE as a root node or leaf node; and configure role information of the second PE as a root node or leaf node. If the application scenario of the network service is a unidirectional MPLS scenario, configure the role information of the first PE as an ingress node or egress node; and configure role information of the second PE as an ingress node or egress node. In an inter-domain MPLS TE scenario, role information of a device across multiple domains may be further configured as a border node. The inter-domain device may be a PE, and may also be a P device.

Further, in the foregoing configuration procedure, an attribute used by each PE for establishing the MPLS TE tunnel may be further configured. The attribute includes bandwidth information, an explicit path, an affinity attribute, fast rerouting, and so on. A preferable implementation manner for configuring the attribute used by the PE for establishing the MPLS TE tunnel is: to configure an MPLS TE tunnel template used by the PE, where the template defines the attribute used by the PE for establishing the MPLS TE tunnel.

In addition, for a PE, after a Mesh Group to which the PE belongs is configured, it is further needed to configure information such as an attribute used by a certain Mesh Group on the PE for establishing the MPLS TE tunnel, a policy of establishing the MPLS TE tunnel by using the configured attribute, and so on. The same PE may belong to different Mesh Groups at the same time. Different Mesh Groups may establish the MPLS TE tunnel by using different attributes. The policy of establishing the MPLS TE tunnel by using the configured attribute may be a shared manner or an exclusive manner. The shared manner indicates that when the MPLS TE tunnel is established by using the configured attribute, it is discovered that a corresponding MPLS TE tunnel already exists in the Mesh Group, so that the MPLS TE tunnel does not need to be established, and the existing MPLS TE tunnel is directly used. The exclusive manner indicates that when the MPLS TE tunnel is established by using the configured attribute, the existing MPLS TE tunnel is not considered, and an independent MPLS TE tunnel needs to be established for a service in the Mesh Group.

In this embodiment, the Mesh Group to which each PE belongs and the role information of each PE in the network service are pre-configured in the network, which provides a condition for each PE to release the information of the Mesh Group to which each PE belongs and the role information of each PE in the network service, and determine whether to establish the MPLS TE tunnel to another PE according to the information of the Mesh Group to which other PEs belong and the role information of other PEs in the network service. In addition, an execution manner of the configuration operation is not limited in this embodiment, which may be a manual configuration and may also be an automatic configuration of each PE, having a feature of flexible implementation.

Figure 3:
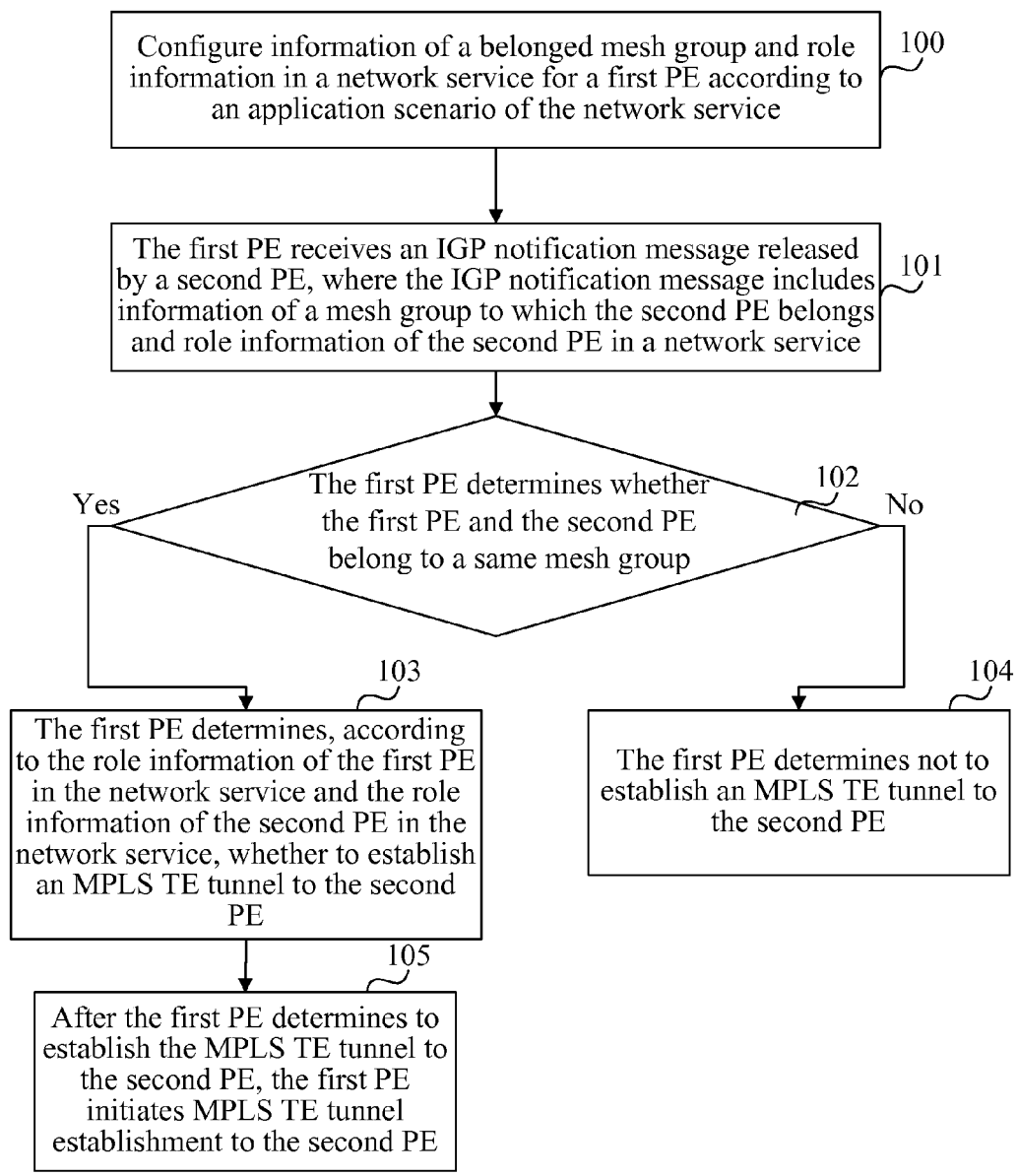
FIG. 3 is a flow chart of a method for determining to establish an MPLS TE tunnel according to still another embodiment of the present invention.

FIG. 3 is a flow chart of a method for determining to establish an MPLS TE tunnel according to still another embodiment of the present invention. This embodiment is implemented based on the embodiment shown in FIG. 2, and as shown in FIG. 3, the method in this embodiment, after step 103, includes:

Step 105: After the first PE determines to establish the MPLS TE tunnel to the second PE, the first PE initiates MPLS TE tunnel establishment to the second PE.

If the first PE and the second PE belong to a same IGP process or area, that is, in each application scenario that is not inter-domain, after determining, according to the role information of the first PE in the network service and the role information of the second PE in the network service, that the MPLS TE tunnel needs to be established to the second PE, the first PE uses an attribute corresponding to the Mesh Group and a shared/exclusive tunnel policy, and triggers a procedure of directly establishing the MPLS TE tunnel with the second PE, which does not have to pass through an inter-domain border node.

If the first PE and the second PE belong to different IGP processes or areas, that is, in an inter-domain MPLS TE scenario, after the first PE determines, according to the role information of the first PE in the network service and the role information of the second PE in the network service, that the MPLS TE tunnel needs to be established to the second PE, the first PE selects, from the Mesh Group to which the first PE belongs, a device whose role information is a border node, establishes a path to the selected device whose role information is the border node, and triggers that the selected device whose role information is the border node establishes a path to the second PE, so as to complete establishing the MPLS TE tunnel to the second PE.

The path established from the first PE to the device whose role information is the border node and the path established from the device whose role information is the border node to the second PE form the MPLS TE tunnel from the first PE to the second PE. Both a procedure that the first PE establishes the path to the device whose role information is the border node and a procedure that the device whose role information is the border node establishes the path to the second PE have a same manner with a procedure that the first PE directly initiates the MPLS TE tunnel establishment to the second PE. When establishing the path to the device whose role information is the border node, the first PE notifies the device whose role information is the border node that the device whose role information is the border node needs to establish the path to the second PE and notifies the device whose role information is the border node of the role information of the second PE at the same time.

Optionally, role information of the border node may include a master border node and a backup border node. That is to say, in the inter-domain MPLS TE scenario, the role information of the first PE or the second PE or another PE or a P device may further be a master border node or a backup border node.

Optionally, that the first PE selects a device whose role information is a border node from the Mesh Group to which the first PE belongs, establishes a path to the selected device whose role information is the border node, and triggers that the selected device whose role information is the border node establishes a path to the second PE, so as to complete establishing the MPLS TE tunnel to the second PE includes:

The first PE selects a device whose role information is a master border node from the Mesh Group to which the first PE belongs, establishes a path to the selected device whose role information is the master border node, and triggers that the selected device whose role information is the master border node establishes a path to the second PE, so as to complete establishing a master MPLS TE tunnel to the second PE; and/or The first PE selects a device whose role information is a backup border node from the Mesh Group to which the first PE belongs, establishes a path to the selected device whose role information is the backup border node, and triggers that the selected device whose role information is the backup border node establishes a path to the second PE, so as to complete establishing a backup MPLS TE tunnel to the second PE.

Further, the first PE may pre-bind the Mesh Group for an L3VPN or L2VPN service of the first PE, and bears the L3VPN or L2VPN service belonging to the Mesh Group by using an MPLS TE tunnel corresponding to the Mesh Group.

The first PE may also not pre-bind the Mesh Group for the L3VPN or L2VPN service of the first PE, but binds the L3VPN or L2VPN service with the Mesh Group when starting the L3VPN or L2VPN service, and bears the L3VPN or L2VPN service belonging to the Mesh Group by using an MPLS TE tunnel corresponding to the bound Mesh Group.

In this embodiment, after each PE determines to establish the MPLS TE tunnel to another PE according to role information of each PE in the network service and role information of the another PE belonging to the same Mesh Group in the network service, each PE directly initiates the MPLS TE tunnel establishment to the another PE, which lays a foundation for starting the L3VPN or L2VPN service based on the established MPLS TE tunnel.

Optionally, in the foregoing embodiments, the first PE further sends an IGP notification message to the second PE (namely, another PE in the network) in addition to receiving an IGP notification message of the second PE. The IGP notification message sent by first PE includes information of the Mesh Group to which the first PE belongs and the role information of the first PE in the network service. In this way, after receiving the IGP notification message of the first PE, the second PE first may first determine, according to the information of the Mesh Group to which the first PE belongs and information of the Mesh Group to which the second PE belongs, whether the first PE and the second PE belong to the same Mesh Group; after determining that the first PE and the second PE belong to the same Mesh Group, the second PE further determines, according to the role information of the first PE in the network service and the role information of the second PE in the network service, whether to establish the MPLS TE tunnel to the first PE; and after determining that the first PE and the second PE do not belong to the same Mesh Group, the second PE determines not to establish the MPLS TE tunnel to the first PE.

Optionally, in the forgoing embodiments, when the information of the Mesh Group to which the second PE belongs and/or the role information of the second PE in the network service changes, the second PE re-sends the IGP notification message. Accordingly, the first PE receives the IGP notification message re-sent by the second PE, and re-determines whether to establish the MPLS TE tunnel to the second PE. Similarly, when the information of the Mesh Group to which the first PE belongs and/or the role information of the first PE in the network service changes, the first PE re-sends the IGP notification message. Accordingly, the second PE receives the IGP notification message re-sent by the first PE, and re-determines whether to establish the MPLS TE tunnel to the first PE.

A procedure of a method for establishing an MPLS TE tunnel provided in the present invention is described in detail in combination with several specific application scenarios in the following.

Figure 4A:
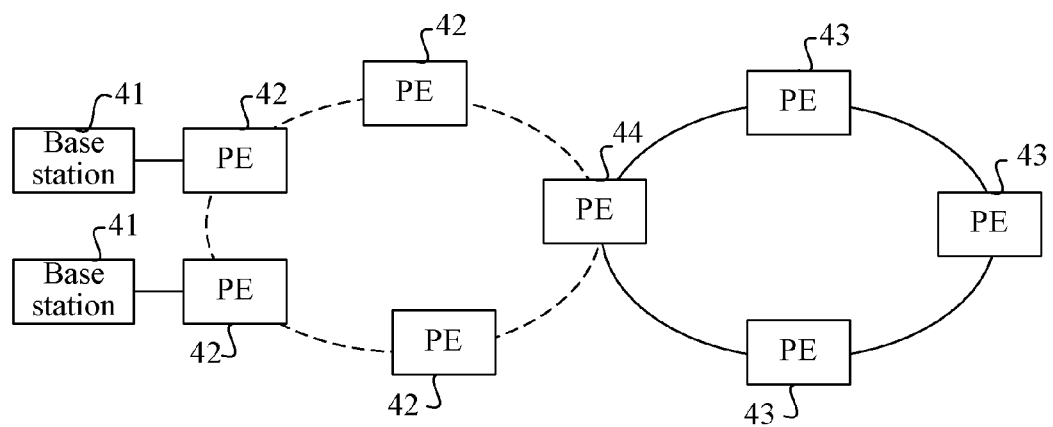
FIG. 4A is a schematic structural diagram of a network in a Hub-Spoke scenario according to an embodiment of the present invention.
Figure 4B:
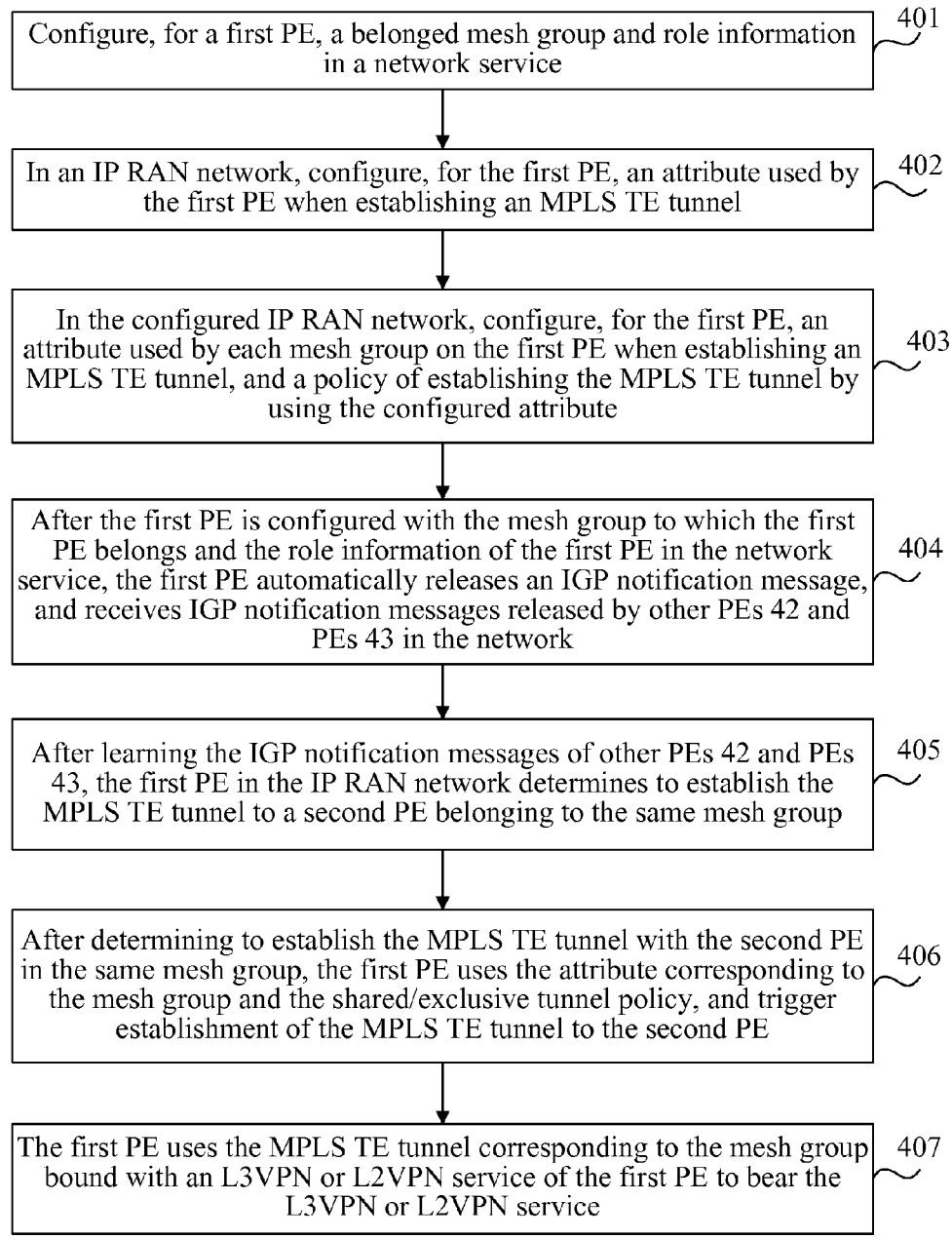
FIG. 4B is a flow chart of a method for establishing an MPLS TE tunnel in the Hub-Spoke scenario according to an embodiment of the present invention.

FIG. 4A is a schematic structural diagram of a network in a Hub-Spoke scenario according to an embodiment of the present invention. FIG. 4B is a flow chart of a method for establishing an MPLS TE tunnel in the Hub-Spoke scenario according to the embodiment of the present invention.

In this embodiment, a Hub-Spoke service scenario in an IP RAN network is taken as an example, and the IP RAN network shown in FIG. 4A includes: base stations 41, PEs 42 on an access ring, PEs 43 on an aggregation ring, and a P device 44 on both the access ring and the aggregation ring. In FIG. 4A, the ring shown in a dotted line is the access ring, and the ring shown in a solid line is the aggregation line. Each PE 42 on the access ring is connected to a base station 41, for convenience of illustration, FIG. 4A shows only two base stations 41 connected to the PEs 42, and another base station 41 connected to the PEs 42 are not shown.

From a perspective of the IP RAN, a PE 42 on the access ring is a CSG, and a PE 43 on the aggregation ring is an RSG. In addition, as the RSG is similar to a hub (Hub), a connection between the CSG and the RSG is similar to a spoke (Spoke), the CSG is connected to the Hub through the Spoke, and CSGs do not need to connect to each other through the Spoke. For a feature of the IP RAN network, in this embodiment, an existing Mesh Group mechanism is extended as follows: A Mesh Group node is defined with two roles, one is a Hub node, and the other is a Spoke node. In the IP RAN network, a role of the CSG is the Spoke node, and a role of the RSG is the Hub node.

As shown in FIG. 4B, the method in this embodiment includes:

Step 401: Configure, for the first PE, a Mesh Group to which a first PE belongs and role information of the first PE in a network service.

The first PE may be a PE 42 or a PE 43, and a second PE may also be a PE 42 or a PE 43. In this embodiment, the description is made by taking that the first PE is a certain PE 42, and the second PE is a certain PE 43 as an example.

In this embodiment, in addition to configuring the Mesh Group to which the first PE belongs and the role information of the first PE in the network service, Mesh Groups to which other PEs 42 and PEs 43 belong and role information of other PEs 42 and PEs 43 in the network service also need to be configured.

Specifically, a role of the PE 42 is configured as a Spoke node, and a role of the PE 43 is configured as a Hub node. Mesh Groups to which each PE 42 and PE 43 belong are configured according to a service category, for example, an L3VPN service is bound with a Mesh Group, that is, each PE 42 and PE 43 supporting the L3VPN service are configured into a same Mesh Group. An L2VPN service is bound with another Mesh Group, that is, each PE 42 and PE 43 supporting the L2VPN service are configured into the same Mesh Group.

It should be noted that, step 401 is an optional step in this embodiment. The first PE may be pre-configured with the Mesh Group to which the first PE belongs and the role information of the first PE in the network service.

Step 402: In the IP RAN network, configure, for the first PE, an attribute used by the first PE for establishing an MPLS TE tunnel.

Preferably, an MPLS TE tunnel template may be used to define the attribute used for establishing the MPLS TE tunnel, and an MPLS TE tunnel template used by each first PE is configured, so as to achieve an objective of configuring the attribute used by the first PE for establishing the MPLS TE tunnel.

In this embodiment, in addition to configuring the attribute used by the first PE for establishing the MPLS TE tunnel, attributes used by other PEs 42 or PEs 43 for establishing the MPLS TE tunnel may also be configured.

It should be noted that, step 402 is an optional step in this embodiment.

Step 403: In IP RAN network, configure, for the first PE, an attribute used by each Mesh Group on the first PE for establishing the MPLS TE tunnel, and a policy of establishing the MPLS TE tunnel by using the configured attribute.

The first PE may be configured with multiple different Mesh Groups. In addition to the first PE, other PEs 42 or PEs 43 may also be configured with multiple different Mesh Groups. Different Mesh Groups may establish the MPLS TE tunnel by using different attributes. The policy of establishing the MPLS TE tunnel by using the configured attribute may be a shared manner or an exclusive manner. Reference is made to the description of the embodiment shown in FIG. 2 for description of the shared manner and the exclusive manner.

It should be noted that, step 403 is an optional step in this embodiment.

Step 404: After the first PE is configured with the Mesh Group to which the first PE belongs and the role information of the first PE in the network service, the first PE automatically releases an IGP notification message, and receives IGP notification messages released by other PEs 42 and PEs 43 in the network.

Taking the first PE as an example, the first PE releases the IGP notification message to other PEs 42 and all the PEs 43, and receives the IGP notification messages released by the other PEs 42 and all the PEs 43.

Taking the second PE as an example, the second PE also releases an IGP notification message to other PEs 43 and all the PEs 42, and receives the IGP notification messages released by the other PEs 43 and all the PEs 42.

In the IGP notification message, a Mesh Group to which a PE belongs may be indicated by using a Mesh Group number, and role information of the PE in the network service may be indicated by using a corresponding role bit, which is not limited here.

Step 405: After learning the IGP notification messages of other PEs 42 and PEs 43, the first PE in the IP RAN network determines to establish the MPLS TE tunnel to the second PE belonging to the same Mesh Group.

Specifically, the first PE identifies a Mesh Group to which a PE sending an IGP notification message belongs according to a Mesh Group number in the received IGP notification message, and identifies, according to a bit of a Spoke role and a bit of a Hub role in the IGP notification message, a role of the PE sending the IGP notification message.

The first PE determines, according to the Mesh Group to which the first PE belongs and the Mesh Groups to which other PEs 42 and PEs 43 belong, a PE 42 and PE 43 belonging to the same Mesh Group with the first PE; and then determines, according to the role information of the first PE in the network service and role information of the PE 42 and PE 43 belonging to the same Mesh Group with the first PE in the network service, that the MPLS TE tunnel needs to be established with the PE 43 in the same Mesh Group, and the MPLS TE tunnel does not needs to be established with the PE 42 in the same Mesh Group. That is, the Spoke node determines to establish the MPLS TE tunnel to the Hub node in the same Mesh Group.

In this embodiment, assume that a PE 43 that belongs to the same Mesh Group with the first PE exists, the PE 43 is referred to as the second PE, and the first PE determines to establish the MPLS TE tunnel to the second PE.

Other PEs 42 also adopt a manner the same as that of the first PE to determine whether to establish an MPLS TE tunnel tp a certain PE 43.

Similarly, each PE 43 identifies a Mesh Group to which a PE sending an IGP notification message belongs according to a Mesh Group number in the received IGP notification, and identifies, according to a bit of a Spoke role and a bit of a Hub role in the IGP notification message, a role of the PE sending the IGP notification message.

Each PE 43 identifies a PE 42 and PE 43 belonging to a same Mesh Group with it according to the Mesh Group to which it belongs and Mesh Groups to which other PEs 43 and all the PEs 42 belong; and then determines, according to the role information of it in the network service and the role information of the PE 42 and PE 43 belonging to the same Mesh Group with it in the network service, that the MPLS TE tunnel needs to be established with the PE 42 in the same Mesh Group. That is, the Hub node determines to establish the MPLS TE tunnel to the Spoke node in the same Mesh Group.

Optionally, in this embodiment, the following content may be further included.

Step 406: After determining to establish the MPLS TE tunnel with the second PE in the same Mesh Group, the first PE uses the attribute corresponding to the Mesh Group and the shared/exclusive tunnel policy to trigger establishment of the MPLS TE tunnel to the second PE.

Specifically, the first PE uses an RSVP-TE protocol to establish the MPLS TE tunnel from the first PE to the second PE in the same Mesh Group.

Similarly, other PEs 42 or PEs 43 also use the RSVP-TE protocol to establish MPLS TE tunnels from them to PEs 43 or PEs 42 in the same Mesh Group.

Step 407: The first PE uses the MPLS TE tunnel corresponding to the Mesh Group bound with the L3VPN or L2VPN service of the first PE to bear the L3VPN or L2VPN service.

If the first PE pre-binds a specific Mesh Group for the L3VPN or L2VPN service of the first PE, the MPLS TE tunnel corresponding to the Mesh Group is used to bear the L3VPN or L2VPN service belonging to the Mesh Group.

If the first PE does not pre-bind a specific Mesh Group for the L3VPN or L2VPN service of the first PE, when the L3VPN or L2VPN service is started, a Mesh Group is bound for the service of the first PE, and an MPLS TE tunnel corresponding to the Mesh Group is used to bear the corresponding service.

For other PEs 42 or PEs 43, the manner of using the MPLS TE tunnel to bear the corresponding service is the same as that of the first PE.

Further, if the Mesh Group to which a PE or a service of the PE belongs changes, or role information of the PE in the network service changes, re-releasing of an IGP notification message is triggered, and each PE, according to an updated Mesh Group and updated role information in the network service, triggers deletion of an existing MPLS TE tunnel and establishes a new MPLS TE tunnel.

Figure 5A:
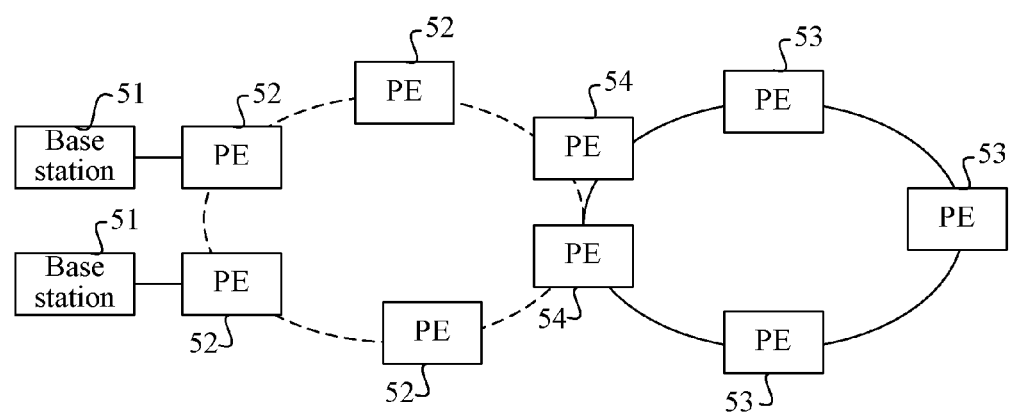
FIG. 5A is a schematic structural diagram of a network in an inter-domain MPLS TE scenario according to another embodiment of the present invention.
Figure 5B:
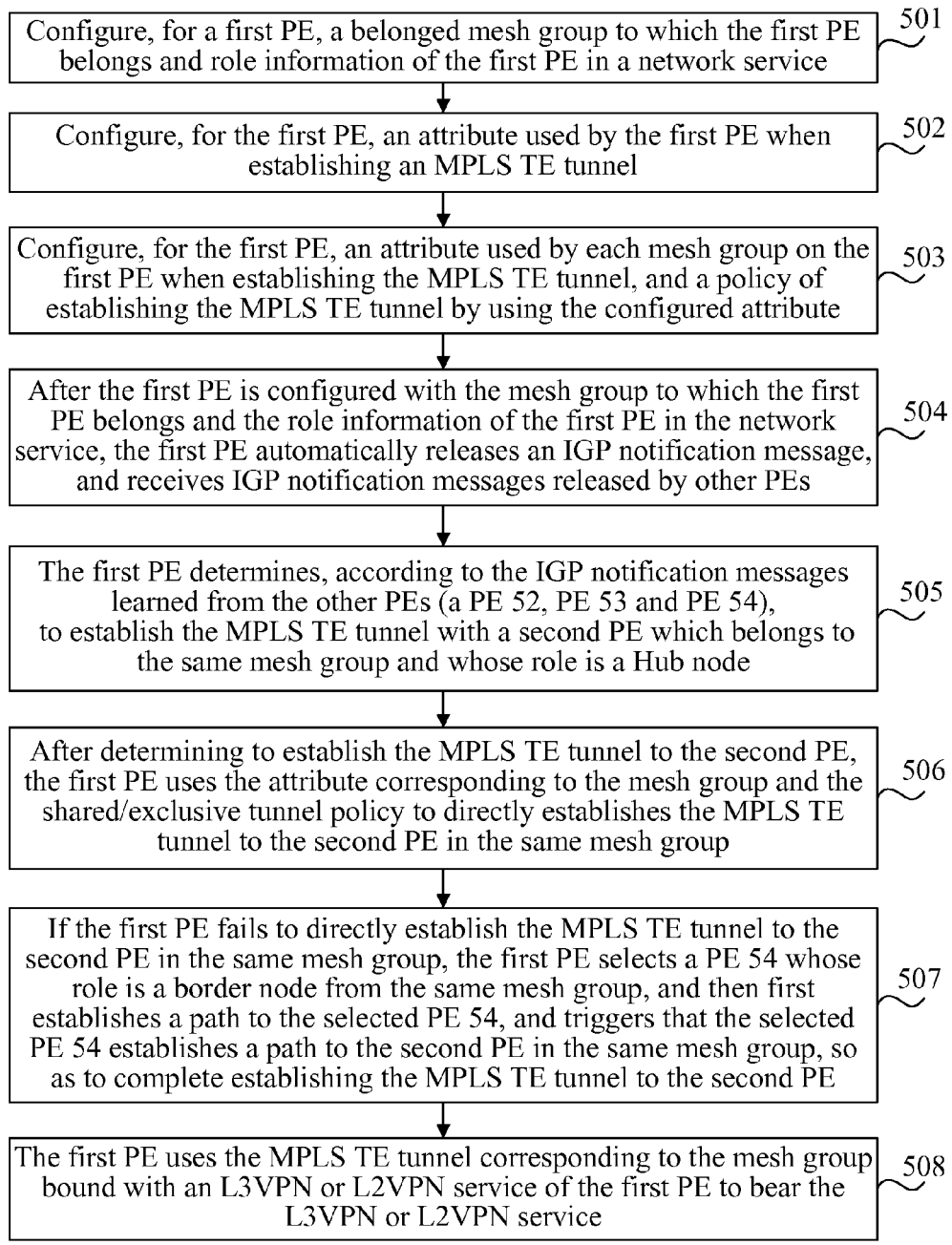
FIG. 5B is a flow chart of a method for establishing an MPLS TE tunnel in the inter-domain MPLS TE scenario according to another embodiment of the present invention.

In this embodiment, by pre-configuring the Mesh Group to which each PE belongs and the role information of each PE in the network service, and releasing the belonged Mesh Group and the role information in the network service through the IGP notification message at the same time, each PE determines whether to establish the MPLS TE tunnel between each other according to both the belonged Mesh Group and the role information in the network service, which not only may ensure that the MPLS TE tunnel between a CSG and an RSG in the network is successfully established, but also may avoid establishing an MPLS TE tunnel between a CSG and another CSG or between an RSG and another RSG, overcomes a limitation in establishing the MPLS TE tunnel by using a Mesh Group solution, and saves a resource consumed due to establishing the MPLS TE tunnel between the CSG and the another CSG or between the RSG and the another RSG FIG. 5A is a schematic structural diagram of a network in an inter-domain MPLS TE scenario according to another embodiment of the present invention. FIG. 5B is a flow chart of a method for establishing an MPLS TE tunnel in the inter-domain MPLS TE scenario according to the another embodiment of the present invention.

In this embodiment, an inter-domain MPLS TE service scenario in an IP RAN network is taken as an example, and the IP RAN network shown in FIG. 5A includes: base stations 51, PEs 52 on an access ring, PEs 53 on an aggregation ring, and PEs 54 on both the access ring and the aggregation ring. In FIG. 5A, the ring shown in a dotted line is the access ring, where the access ring belongs to a first IGP process or area; and the ring shown in a solid line is the aggregation ring, where the aggregation ring belongs to a second IGP process or area. The PEs 54 are located in the two areas.

From a perspective of the IP RAN, a PE 52 on the access ring is a CSG, and a PE 53 on the aggregation ring is an RSG. For a feature of an inter-domain MPLS TE service in the IP RAN network, in this embodiment, an existing Mesh Group mechanism is extended as follows: A Mesh Group node is defined with three roles, one is a Hub node, one is a Spoke node, and one is a border node. In FIG. 5A, a role of each PE 52 is the Spoke node, a role of each PE 53 is the Hub node, and a role of a PE 54 is the border node.

As shown in FIG. 5B, the method in this embodiment includes:

Step 501: Configure, for the first PE, a Mesh Group to which a first PE belongs and role information of the first PE in a network service.

In this embodiment, network division is performed on the IP RAN network shown in FIG. 5A by using an IGP multi-process or multi-area technology, that is, PEs on the access ring and the aggregation ring each belong to different IGP processes or areas, which facilitates control of the number of nodes and links in the network. In this case, as MPLS TE link information is released only in a current area or process, a PE 52 or PE 53 in the IGP process or area may lack complete MPLS TE link information, so that a path to a PE 53 or PE 52 cannot be directly computed, and this is the inter-domain MPLS TE scenario.

In the inter-domain MPLS TE scenario, the border node belongs to multiple IGP processes or areas at the same time, and has more complete MPLS TE link information, so an MPLS TE tunnel may be established between PEs through the border node in the inter-domain MPLS TE scenario. As shown in FIG. 5A, the PE 54 belongs to both the first IGP process and the second IGP process or area, and the role of the PE 54 is the border node.

Based on the foregoing description, in this embodiment, a role of a PE 52 is a Spoke node, a role of a PE 53 is a Hub node, and the role of the PE 54 is the border node. The first PE may be a PE 52 or PE 53, and accordingly, a second PE may also be a PE 52 or PE 53. In this embodiment, the description is made by taking that the first PE is a PE 52, and the second PE is a PE 53 as an example.

In this embodiment, in addition to configuring the Mesh Group to which the first PE belongs and the role information of the first PE in the network service, Mesh Groups to which other PEs 52, PEs 53, and PEs 54 belong and role information of the others PE 52, PEs 53, and PEs 54 in the network service also need to be configured.

Specifically, according to the divided IGP process or area, the role of the PE 52 is configured as the Spoke node; the role of the PE 53 is configured as the Hub node; and the role of the PE 54 is configured as the border node.

Mesh Groups to which each PE 52, PE 53, and PE 54 belong are configured according to a service category, for example, an L3VPN service is bound with a Mesh Group, that is, each PE 52, PE 53, and PE 54 supporting the L3VPN service are configured into a same Mesh Group. An L2VPN service is bound with another Mesh Group, that is, each PE 52, PE 53, and PE 54 supporting the L2VPN service are configured into a same Mesh Group.

It should be noted that, step 501 is an optional step in this embodiment. The first PE may be pre-configured with the Mesh Group to which the first PE belongs and the role information of the first PE in the network service.

Step 502: Configure, for the first PE, an attribute used by the first PE for establishing an MPLS TE tunnel.

Preferably, an MPLS TE tunnel template may be used to define the attribute used for establishing the MPLS TE tunnel, and an MPLS TE tunnel template used by each first PE is configured, so as to achieve an objective of configuring the attribute used by the first PE for establishing the MPLS TE tunnel.

In this embodiment, in addition to configuring the attribute used by the first PE for establishing the MPLS TE tunnel, attributes used by other PE 52, PE 53, and PE 54 for establishing the MPLS TE tunnel may also be configured.

It should be noted that, step 502 is an optional step in this embodiment.

Step 503: Configure, for the first PE, an attribute used by each Mesh Group on the first PE for establishing the MPLS TE tunnel, and a policy of establishing the MPLS TE tunnel by using the configured attribute.

The first PE may be configured with multiple different Mesh Groups. In addition to the first PE, other PE 52, PE 53, and PE 54 may also be configured with multiple different Mesh Groups. Different Mesh Groups may establish the MPLS TE tunnel by using different attributes. The policy of establishing the MPLS TE tunnel by using the configured attribute may be a shared manner or an exclusive manner. Reference is made to the description of the embodiment shown in FIG. 2 for description of the shared manner and the exclusive manner.

It should be noted that, step 503 is an optional step in this embodiment.

Step 504: After the first PE is configured with the Mesh Group to which the first PE belongs and the role information of the first PE in the network service, the first PE automatically releases an IGP notification message, and receives IGP notification messages released by other PEs (for example, a PE 52, PE 53, and PE 54).

The first PE releases the IGP notification message to other PEs 52, all the PEs 53, and all the PEs 54, and receives the IGP notification messages released by the other PEs 52, all the PEs 53, and all the PEs 54.

Similarly, each 53 releases an IGP notification message to other PEs 53, all the PEs 52, and all the PEs 54, and receives the IGP notification messages released by other PE 53, all the PEs 52, and all the PEs 54.

Similarly, each PE 54 releases an IGP notification message to another PE 54, all the PEs 52, and all the PEs 53, and receives the IGP notification messages released by the another PE 54, all the PEs 52, and all the PEs 53.

In this embodiment, in the IGP notification message released by each PE, a Mesh Group to which each PE belongs may also be indicated by using a Mesh Group number, role information of each PE in the network service may be indicated by using a bit of each role, which is not limited here.

Step 505: The first PE determines to establish the MPLS TE tunnel with the second PE that belongs to the same Mesh Group and whose role is a Hub node according to the IGP notification message learned from other PEs (a PE 52, PE 53, and PE 54).

In this embodiment, the second PE is a PE 53.

Specifically speaking, each PE 52 determines to establish the MPLS TE tunnel with a PE 53 that belongs to the same Mesh Group and whose role is the Hub node; and each PE 53 determines to establish the MPLS TE tunnel with a PE 52 that belongs to the same Mesh Group and whose role is the Spoke node.

Optionally, in this embodiment, the following content may be further included.

Step 506: After determining to establish the MPLS TE tunnel to the second PE, the first PE uses the attribute corresponding to the Mesh Group and the shared/exclusive tunnel policy to directly establish the MPLS TE tunnel to the second PE in the same Mesh Group.

Specifically, a PE 52 directly calculates the path from the PE 52 to a PE 53 in the same Mesh Group, if the calculation is successful, the PE 52 triggers establishment of the MPLS TE tunnel to the PE 53 in the same Mesh Group; and if the calculation fails, it means that the PE 52 cannot directly reach the PE 53 in the same Mesh Group.

Similarly, a PE 53 directly calculates the path from the PE 53 to a PE 52 in the same Mesh Group, if the calculation is successful, the PE 53 triggers establishment of the MPLS TE tunnel to the PE 52 in the same Mesh Group; and if the calculation fails, it means that the PE 53 cannot directly reach the PE 52 in the same Mesh Group.

In this embodiment, when identifying a PE in the same Mesh Group whose role is a border node according to the IGP notification message, the PE 52 or PE 53 uses the identified PE whose role is the border node as a backup node for the MPLS TE tunnel path calculation. Therefore, when the calculation fails, the PE 52 or PE 53 may select a PE whose role is a border node from the same Mesh Group as an intermediate node from the PE 52 or PE 53 to a PE 53 or PE 52 in the same Mesh Group, and establish the MPLS TE tunnel to the PE 53 or PE 52 in the same Mesh Group based on the selected PE whose role is the border node, that is, execute step 507.

In this embodiment, the PE whose role is the border node is a PE 54. It is noted here that, the device whose role is the border node is not limited to a PE, and may also be a P device.

Specifically, the PE 52 or PE 53 uses an RSVP-TE protocol to directly establish the MPLS TE tunnel from it to the PE 53 or PE 52 in the same Mesh Group.

Step 507: If the first PE fails to directly establish the MPLS TE tunnel to the second PE in the same Mesh Group, the first PE selects a PE 54 whose role is a border node from the same Mesh Group, and then establishes a path to the selected PE 54, and triggers that the selected PE 54 establishes a path to the second PE in the same Mesh Group, so as to complete establishing the MPLS TE tunnel to the second PE.

The first PE also uses the RSVP-TE protocol to establish the path to the PE 54 whose role is the border node in the same Mesh Group, and the path is actually an MPLS TE tunnel from the first PE to the PE 54. The PE 54 whose role is the border node also uses the RSVP-TE protocol to establish the path to the second PE in the same Mesh Group, and the path is actually an MPLS TE tunnel from the PE 54 to the second PE. The two paths form a path from the first PE to the second PE, namely, the MPLS TE tunnel.

When establishing the path to the PE 54, the first PE notifies the PE 54 that the PE 54 needs to establish the path to the second PE, and notifies the PE 54 of information of the second PE, so that the PE 54 may identify the second PE and establish the path to the second PE.

In this step, if the selected PE 54 whose role is the border node successfully establishes the path to the second PE in the same Mesh Group, the step ends; and otherwise, the selected PE 54 whose role is the border node returns information of no path to a head end (that is, to the first PE).

Accordingly, the first PE re-selects another PE 54 whose role is the border node from the same Mesh Group according to the information of no path, where the information is fed back by the selected PE 54 whose role is the border node, and continues to try the path calculation and the MPLS TE tunnel establishment according to the operation of step 507.

Step 508: The first PE uses the MPLS TE tunnel corresponding to the Mesh Group bound with the L3VPN or L2VPN service of the first PE to bear the L3VPN or L2VPN service.

Reference may be made to the description of step 407 for step 508, which is not repeatedly described here.

Further, in this embodiment, not only when role information of a PE whose role is a Spoke or Hub node in the network service and/or a Mesh Group to which the PE whose role is the Spoke or Hub node belongs changes, an IGP notification message is re-sent, but also when a role information of a PE whose role is a border node in the network service and/or a Mesh Group to which the PE whose role is the border node belongs changes, the IGP notification message is re-sent. Based on this, each PE in the network triggers deletion of an existing MPLS TE tunnel and establishes a new MPLS TE tunnel according to an updated Mesh Group and updated role information in the network service.

In this embodiment, an inter-domain node is further configured as a border node and release is performed through the IGP notification message, so that nodes in different areas may complete establishing the MPLS TE tunnel through the border node, which solves a problem of establishing the MPLS TE tunnel in the inter-domain scenario.

Further, in the foregoing embodiment, for a PE whose role is the border node, its role may be further divided into a master border node and a backup border node. Accordingly, role information of the PE may be configured as a master border node or a backup border node. When the first PE establishes the MPLS TE tunnel to the second PE in the same Mesh Group through the PE 54 whose role is the border node, the first PE may select a PE 54 whose role is a master border node, establish a path to the selected PE 54 whose role is the master border node, and trigger that the selected PE 54 whose role is the master border node establishes a master MPLS TE tunnel to the second PE in the same Mesh Group. Alternatively, when the first PE establishes the MPLS TE tunnel to the second PE in the same Mesh Group through the PE 54 whose role is the border node, the first PE may select a PE 54 whose role information is a backup border node, establish a path to the selected PE 54 whose role information is a backup border node, and trigger that the selected PE 54 whose role is the backup border node establishes a backup MPLS TE tunnel to the second PE in the same Mesh Group. Alternatively, the first PE selects both the PE 54 whose role is the master border node and the PE 54 whose role is the backup border node, and establishes the master MPLS TE tunnel and the backup MPLS TE tunnel to the second PE in the same Mesh Group at the same time.

In the foregoing embodiment, the role of the border node is further divided, which facilitates the inter-domain MPLS TE tunnel path calculation in a specific scenario.

It is noted here that, in the foregoing embodiment shown in FIG. 4A, when a PE 42 serves as the first PE, a PE 43 belonging to a same Mesh Group with the PE 42 is the second PE; and when a PE 43 serves as the first PE, a PE 42 belonging to a same Mesh Group with the PE 43 is the second PE. Similarly, in FIG. 5A, when a PE 52 serves as the first PE, a PE 53 belonging to a same Mesh Group with the PE 52 is the second PE; and when a PE 53 serves as the first PE, a PE 52 belonging to the same Mesh Group with the PE 53 is the second PE.

Figure 6A:
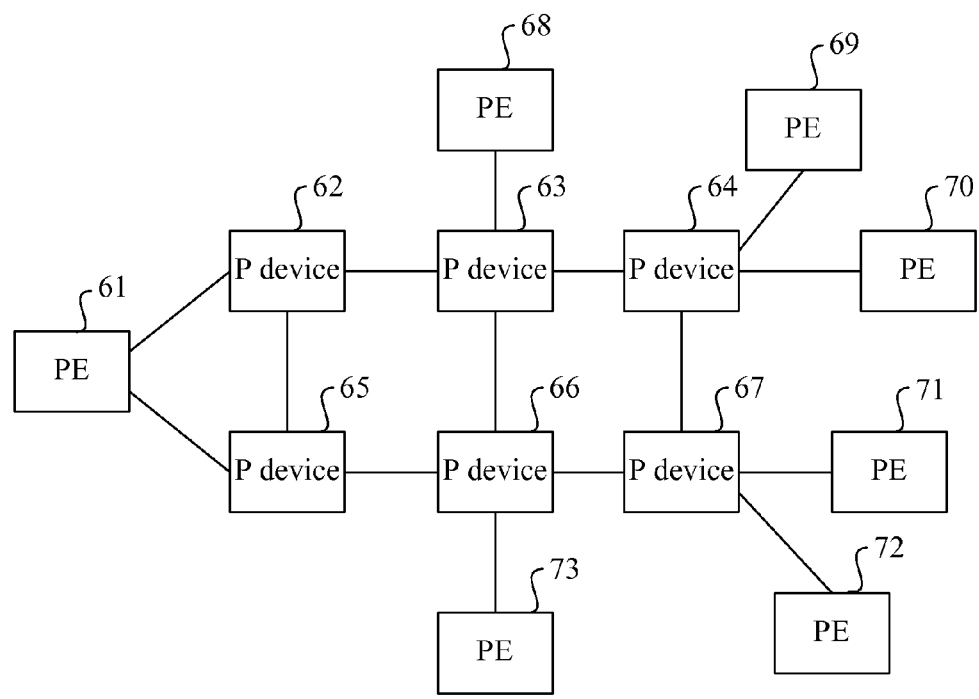
FIG. 6A is a schematic structural diagram of a network in a P2MP MPLS scenario according to an embodiment of the present invention.
Figure 6B:
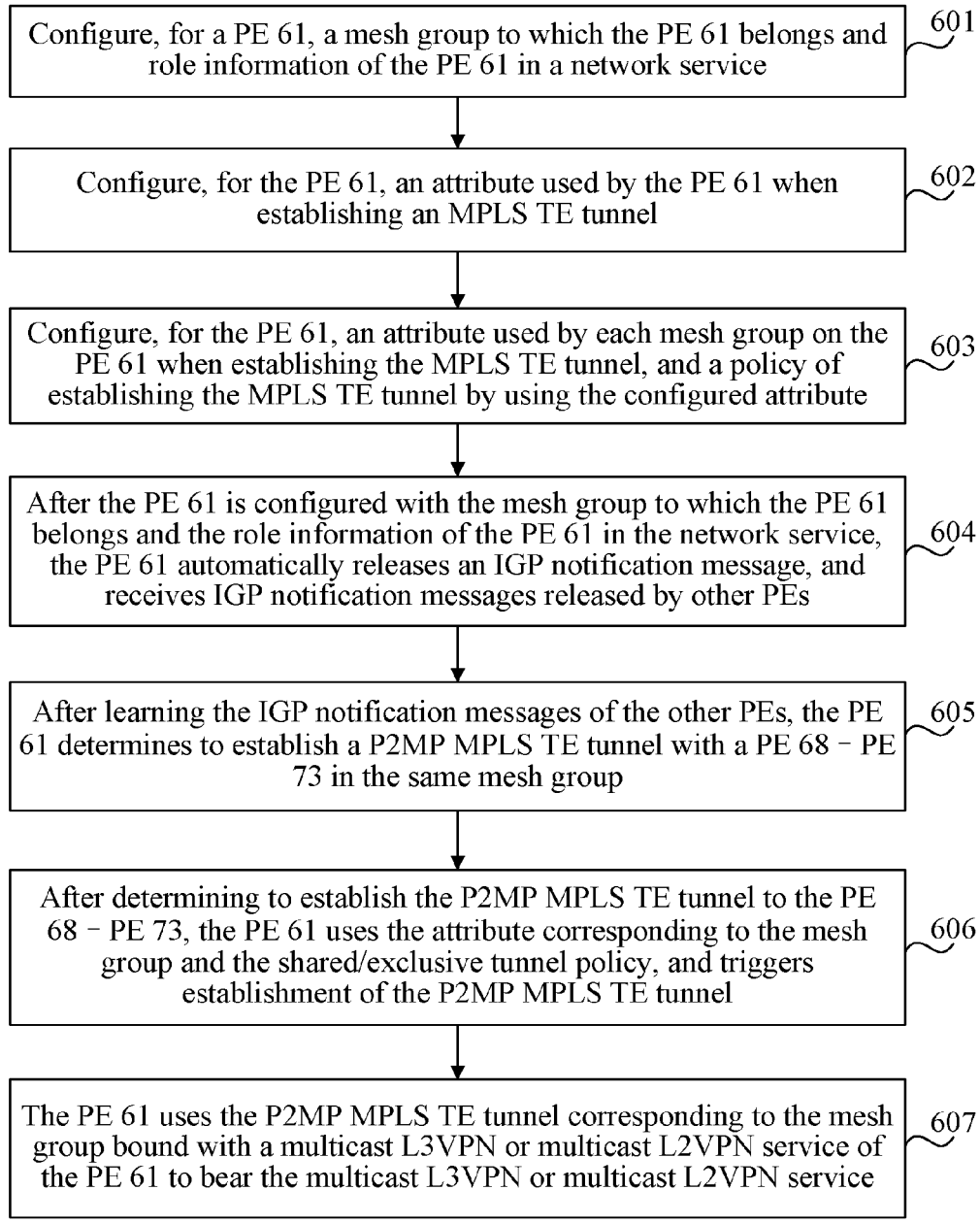
FIG. 6B is a flow chart of a method for establishing an MPLS TE tunnel in the P2MP MPLS scenario according to an embodiment of the present invention.

FIG. 6A is a schematic structural diagram of a network in a P2MP MPLS scenario according to an embodiment of the present invention. FIG. 6B is a flow chart of a method for establishing an MPLS TE tunnel in the P2MP MPLS scenario according to the embodiment of the present invention.

As shown in FIG. 6A, the network in the P2MP MPLS scenario (referred to as a P2MP MPLS network) includes: a PE 61, a P device 62, a P device 63, a P device 64, a P device 65, a P device 66, a P device 67, a PE 68, a PE 69, a PE 70, a PE 71, a PE 72, and a PE 73. The PE 61 is connected to the P device 62 and the P device 65, the P device 62, the P device 63, and the P device 64 are connected in sequence, the P device 65, the P device 66, and the P device 67 are connected in sequence, the P device 62 is connected to the P device 65, the P device 63 is connected to the P device 66, the P device 64 is connected to the P device 67, the PE 68 is connected to the P device 63, the PE 69 is connected to the P device 64, the PE 70 is connected to the P device 64, the PE 71 is connected to the P device 67, the PE 72 is connected to the P device 67, and the PE 73 is connected to the P device 66.

In the network shown in FIG. 6A, the PE 61 needs to establish a P2MP MPLS TE tunnel with the PE 68, PE 69, PE 70, PE 71, PE 72, and PE 73 at the same time. The P2MP MPLS scenario may be a multicast service implemented based on an MPLS TE technology, which is not limited here. For this case, in the prior art, an auto-discovery mechanism of BGP is adopted to implement discovery of each PE in an MVPN. The BGP determines relationship between a root and a leaf between PEs in the MVPN by delivering information between PEs. However, if the network does not support the BGP protocol, the discovery of the relationship between the root and the leaf between the PEs cannot be completed, and the BGP protocol is complicated, which increases difficulty of network management and maintenance.

In this embodiment, to satisfy a demand that P2MP MPLS TE tunnel establishment in the P2MP MPLS network is automatically triggered in a scenario where the BGP is not introduced, an existing IGP Mesh Group mechanism is extended as follows: A Mesh Group defines two roles for a node, one is a root (Root) node in the P2MP, and the other is a leaf (Leaf) node in the P2MP. When releasing Mesh Group information, an IGP releases role information of each PE in the P2MP MPLS network at the same time.

In FIG. 6A, the PE 61 is the root node, and the other PEs are leaf nodes.

Based on this, as shown in FIG. 6B, the method in this embodiment includes:

Step 601: Configure, for the PE 61, a Mesh Group to which the PE 61 belongs and role information of the PE 61 in a network service.

In this embodiment, the PE 61 is a first PE, and the PE 68, PE 69, PE 70, PE 71, PE 72, and PE 73 are all second PEs.

In this embodiment, in addition to configuring the Mesh Group to which the PE 61 belongs and the role information of the PE 61 in the network service, other PEs or P devices also need to be configured. Specifically, the role information of the PE 61 is configured as a root node, and the role information of the PE 68-PE 73 is all configured as leaf nodes. Mesh Groups to which the PE 61 and the PE 68-PE 73 belong are configured according to a service category, for example, a multicast L3VPN service is bound with a Mesh Group, that is, each PE supporting the multicast L3VPN service is configured into a same Mesh Group. A multicast L2VPN service is bound with another Mesh Group, that is, each PE supporting the multicast L2VPN service is configured into a same Mesh Group.

In this embodiment, the PE 61 and the PE 68-PE 73 are configured in the same Mesh Group.

It should be noted that, step 601 is an optional step in this embodiment.

Step 602: Configure, for the PE 61, an attribute used by the PE 61 for establishing an MPLS TE tunnel.

In this embodiment, in addition to configuring the attribute used by the PE 61 for establishing the MPLS TE tunnel, attributes used by other PEs or P devices for establishing the MPLS TE tunnel may also be configured.

It should be noted that, step 602 is an optional step in this embodiment.

Step 603: Configure, for the PE 61, an attribute used by each Mesh Group on the PE 61 for establishing the MPLS TE tunnel, and a policy of establishing the MPLS TE tunnel by using the configured attribute.

The PE 61 and the PE 68-PE 73 may be configured with multiple different Mesh Groups. Different Mesh Groups may establish the MPLS TE tunnel by using different attributes. The policy of establishing the MPLS TE tunnel by using the configured attribute may be a shared manner or an exclusive manner. Reference is made to the description of the embodiment shown in FIG. 2 for description of the shared manner and the exclusive manner.

Step 604: After the PE 61 is configured with the Mesh Group to which the PE 61 belongs and the role information of the PE 61 in the network service, the PE 61 automatically releases an IGP notification message, and receives IGP notification messages released by other PEs.

For the PE 61, the PE 61 releases the IGP notification message to the PE 68-the PE 73, and receives the IGP notification messages released by the PE 68-PE 73.

Take the PE 68 in the other PEs as an example. The PE 68 releases an IGP notification message to the PE 61 and the PE 69 to the PE 73, and receives IGP notification messages released by the PE 61 and the PE 69 to the PE 73.

In this embodiment, in the IGP notification message, a Mesh Group to which a PE belongs may be indicated by using a Mesh Group number, and role information of the PE in the network service may be indicated by using a corresponding role bit, which is not limited here.

Step 605: After learning the IGP notification messages of other PEs, the PE 61 determines to establish a P2MP MPLS TE tunnel with the PE 68-PE 73 in the same Mesh Group.

It is noted here that, the P2MP MPLS TE tunnel in this embodiment is one MPLS TE tunnel from one root node to multiple leaf nodes, instead of multiple MPLS TE tunnels.

In this embodiment, the following content may be further included.

Step 606: After determining to establish the P2MP MPLS TE tunnel to the PE 68-PE 73, the PE 61 uses the attribute corresponding to the Mesh Group and the shared/exclusive tunnel policy, and triggers establishment of the P2MP MPLS TE tunnel.

Specifically, the PE 61 uses an RSVP-TE protocol to establish the P2MP MPLS TE tunnel from the PE 61 to the PE 68-PE 73 in the same Mesh Group.

Step 607: The PE 61 uses the P2MP MPLS TE tunnel corresponding to the Mesh Group bound with the multicast L3VPN or multicast L2VPN service of the PE 61 to bear the multicast L3VPN or multicast L2VPN service.

If the PE 61 and the PE 68-PE 73 pre-bind a specific Mesh Group for the multicast L3VPN or multicast L2VPN service of the PE 61 and the PE 68-PE 73, the MPLS TE tunnel corresponding to the Mesh Group is used to bear the multicast L3VPN or multicast L2VPN service belonging to the Mesh Group.

If the PE 61 and the PE 68-PE 73 do not pre-bind the specific Mesh Group for the multicast L3VPN or multicast L2VPN service of the PE 61 and the PE 68-PE 73, when the multicast L3VPN or multicast L2VPN service is started, a Mesh Group is bound for the service of the PE 61 and the PE 68-PE 73, and an MPLS TE tunnel corresponding to the Mesh Group is used to bear the corresponding service.

Further, if a Mesh Group to which each PE (for example, the PE 61 and the PE 68-PE 73) or the service of each PE belongs changes, or role information of each PE in the network service changes, re-releasing of an IGP notification message is triggered, and the PE 61 re-establishes a P2MP MPLS TE tunnel according to an updated Mesh Group and updated role information in the network service.

In this embodiment, the Mesh Group to which each PE belongs and the role information of each PE in the network service are pre-configured, and the belonged Mesh Group and the role information in the network service are released through the IGP notification message at the same time, so that the PE as the root node determines whether to establish the P2MP MPLS TE tunnel to other PEs according to both the Mesh Group to which each PE belongs and the role information of each PE in the network service, which implements successful establishment of the P2MP MPLS TE tunnel between the root node and multiple leaf nodes in a situation that a BGP protocol is not needed.

Figure 7:
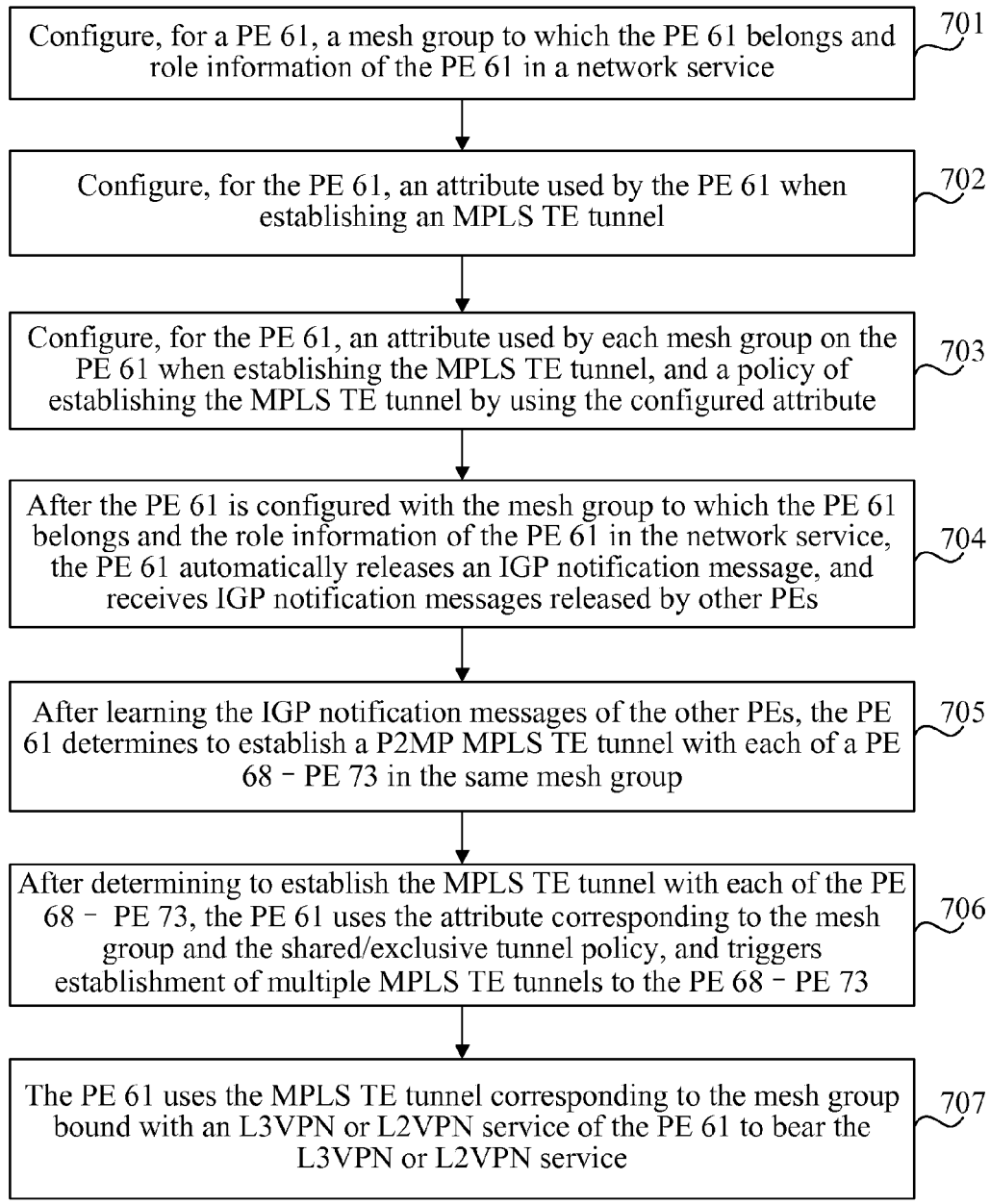
FIG. 7 is a flow chart of a method for establishing an MPLS TE tunnel in a unidirectional MPLS scenario according to an embodiment of the present invention.

FIG. 7 is a flow chart of a method for establishing an MPLS TE tunnel in a unidirectional MPLS scenario according to an embodiment of the present invention. This embodiment is implemented based on the network shown in FIG. 6A. In this embodiment, the PE 61 can only establish an MPLS TE tunnel to any one PE in the PE 68-the PE 73, and the any one PE in the PE 68-PE 73 cannot establish the MPLS TE tunnel to the PE 61 in a reverse direction.

Based on the foregoing description, to support discovery of each PE in a unidirectional MPLS network, an existing IGP Mesh Group mechanism is extended as follows: A Mesh Group defines two roles for a node, one is an ingress (Ingress) node, and the other is an egress (Egress) node. When releasing Mesh Group information, the IGP releases role information of each PE in the unidirectional MPLS network at the same time.

This embodiment caters a service application where a unidirectional MPLS TE tunnel needs to be established, for example, in a case of no P2MP TE tunnel, a method of copying a multicast head end is adopted to support a multicast VPN, that is, an action of using a unidirectional P2P TE tunnel to simulate a P2MP TE; or an application where the unidirectional MPLS TE tunnel is used when only unidirectional traffic exists in some L3VPN scenarios.

As shown in FIG. 7, the method in this embodiment includes:

Step 701: Configure, for the PE 61, a Mesh Group to which the PE 61 belongs and role information of the PE 61 in a network service.

In this embodiment, in addition to configuring the Mesh Group to which the PE 61 belongs and the role information of the PE 61 in the network service, Mesh Groups to which other PEs or P devices belong and role information of other PEs or P devices in the network service also need to be configured. Specifically, the role information of the PE 61 in the network service is configured as an ingress node, and role information of the PE 68-PE 73 in the network service is all configured as egress nodes. The Mesh Groups to which the PE 61 and the PE 68-PE 73 belong are configured according to a service category, for example, an L3VPN service is bound with a Mesh Group, that is, each PE supporting the L3VPN service is configured into a same Mesh Group. An L2VPN service is bound with another Mesh Group, that is, each PE supporting the L2VPN service is configured into a same Mesh Group.

In this embodiment, an example that the PE 61 and the PE 68-PE 73 are configured in the same Mesh Group is taken.

It should be noted that, step 701 is an optional step in this embodiment.

Step 702: Configure, for the PE 61, an attribute used by the PE 61 for establishing the MPLS TE tunnel.

In this embodiment, in addition to configuring the attribute used by the PE 61 for establishing the MPLS TE tunnel, attributes used by other PEs or P devices for establishing the MPLS TE tunnel may also be configured.

It should be noted that, step 702 is an optional step in this embodiment.

Step 703: Configure, for the PE 61, an attribute used by each Mesh Group on the PE 61 for establishing the MPLS TE tunnel, and a policy of establishing the MPLS TE tunnel by using the configured attribute.

It should be noted that, step 703 is an optional step in this embodiment.

Step 704: After the PE 61 is configured with the Mesh Group to which the PE 61 belongs and the role information of the PE 61 in the network service, the PE 61 automatically releases an IGP notification message, and receives IGP notification messages released by other PEs.

For the PE 61, the PE 61 releases the IGP notification message to the PE 68-PE 73, and receives the IGP notification messages released by the PE 68 to the PE 73.

Take the PE 68 in the other PEs as an example. The PE 68 releases an IGP notification message to the PE 61 and the PE 69-PE 73, and receives the IGP notification messages released by the PE 61 and the PE 69-PE 73.

In this embodiment, in the IGP notification message, a Mesh Group to which a PE belongs may be indicated by using a Mesh Group number, and role information of the PE in the network service may be indicated by using a corresponding role bit, which is not limited here.

Step 705: After learning the IGP notification messages of other PEs, the PE 61 determines to establish the MPLS TE tunnel with each of the PE 68-PE 73 in the same Mesh Group.

In this embodiment, the PE 61 learns that the PE 61 and the PE 68-PE 73 belongs to the same Mesh Group, and the role information of the PE 61 in the network service is the root node according to the learned IGP notification message, and the role information of the PE 68-PE 73 in the network service is all the leaf nodes, therefore, the PE 61 determines to establish the MPLS TE tunnel with each of the PE 68-PE 73.

In this embodiment, the following content may be further included.

Step 706: After determining to establish the MPLS TE tunnel with each of the PE 68-PE 73, the PE 61 uses the attribute corresponding to the Mesh Group and the shared/exclusive tunnel policy, and triggers establishment of multiple MPLS TE tunnels to the PE 68-PE 73.

Specifically, the PE 61 uses an RSVP-TE protocol to establish an MPLS TE tunnel to each PE in the PE 68-PE 73.

Step 707: The PE 61 uses the MPLS TE tunnel corresponding to the Mesh Group bound with the L3VPN or L2VPN service of the PE 61 to bear the L3VPN or L2VPN service.

The description of the foregoing step 702 to step 707 is similar to the description of step 602 to step 607, and a difference lies in that, in the embodiment shown in FIG. 6B, a P2MP MPLS TE tunnel is finally established between the PE 61 and the PE 68-PE 73; while in this embodiment, the PE 61 establishes a MPLS TE tunnel with each PE in the PE 68-PE 73, which is a combination of multiple unidirectional MPLS TE tunnels to multiple destination nodes.

In this embodiment, the Mesh Group to which each PE belongs and the role information of each PE in the network service are pre-configured, and the belonged Mesh Group and role are released through the IGP notification message, so that each PE determines whether to establish the MPLS TE tunnel between each other according to both the belonged Mesh Group and role, which implements establishment of the unidirectional MPLS TE tunnel between the nodes, and extends the application of using the Mesh Group to establish the MPLS TE tunnel.

Further, if a PE needs to establish the MPLS TE tunnel with multiple PEs at the same time, and the multiple PEs each belongs to different Mesh Groups, the PE needs to be configured with multiple Mesh Groups. For example, take the Hub-Spoke service scenario or the inter-domain MPLS TE scenario in the IP RAN network as an example. If a PE on the aggregation ring needs to establish the MPLS TE tunnel with multiple PEs on the access ring, and the multiple PEs on the access ring each belongs to different Mesh Groups, the PE on the aggregation ring needs to be configured with multiple Mesh Groups, and the configuration number of the Mesh Groups increases with a needed number, which not only causes resource waste, but also increases a configuration workload.

For the foregoing problem, in this embodiment, the existing IGP Mesh Group is extended as follows: a specific Mesh Group is defined as a shared Mesh Group, and is released through the IGP. A PE in the shared Mesh Group is considered as a common node of different Mesh Groups, PEs in different Mesh Groups consider the PE in the shared Mesh Group as a PE in their Mesh Groups, and establish a corresponding MPLS TE tunnel according to a requirement of a role. The solution is applicable to any one application scenario, for example, the Hub-Spoke scenario, the P2MP MPLS scenario, the unidirectional MPLS scenario, and the inter-domain MPLS TE scenario. Role information of a corresponding PE in the shared Mesh Group in the network service may be a Spoke node or a Hub node, a root node or a leaf node, an ingress node or an egress node, or the Spoke node or the Hub node or a border node.

The following describes how to establish the MPLS TE tunnel based on the shared Mesh Group in detail.

Figure 8:
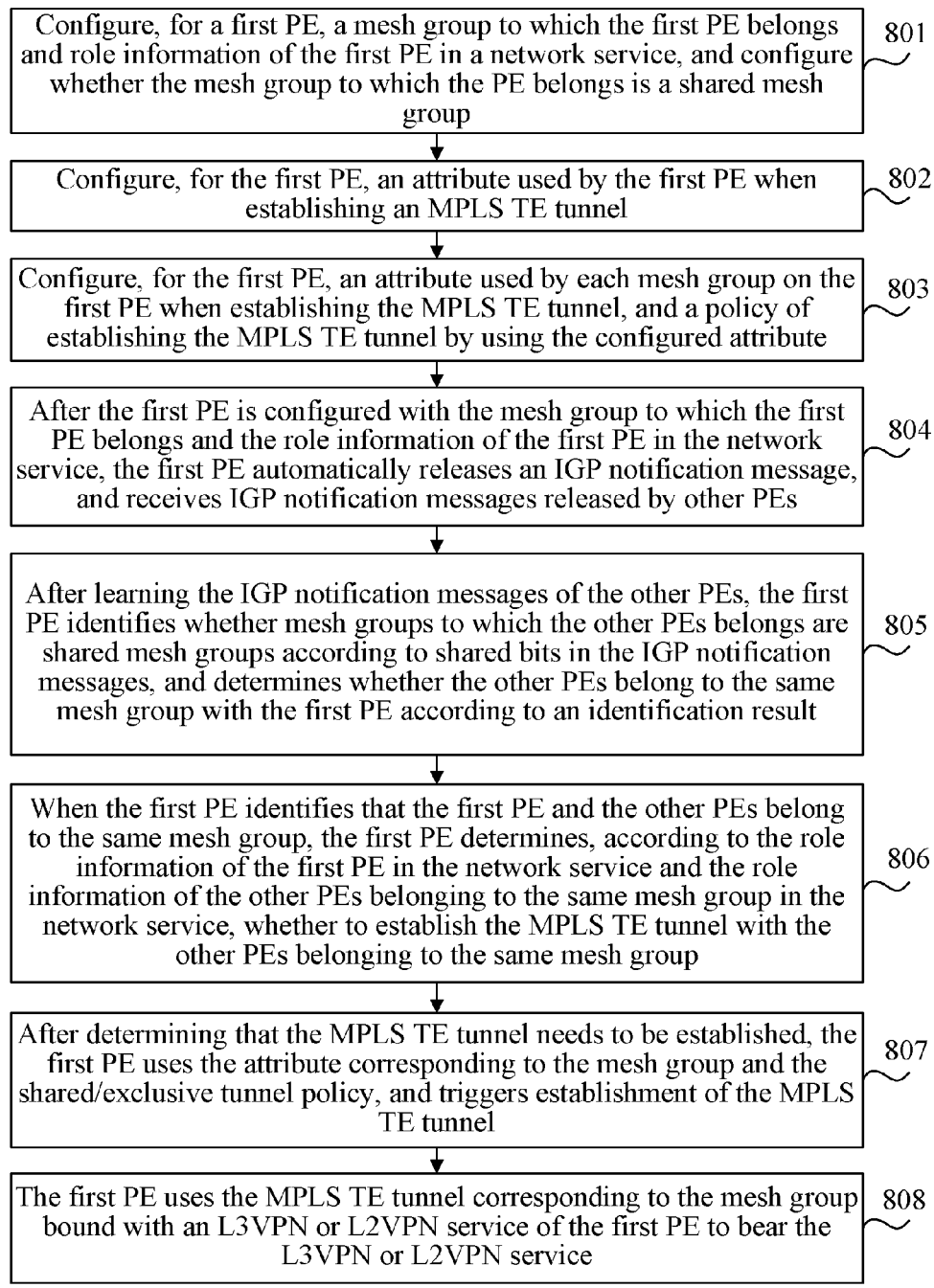
FIG. 8 is a flow chart of establishing an MPLS TE tunnel based on a configuration shared Mesh Group according to an embodiment of the present invention.

FIG. 8 is a flow chart of establishing an MPLS TE tunnel based on a configuration shared Mesh Group according to an embodiment of the present invention. As shown in FIG. 8, the method in this embodiment includes:

Step 801: Configure, for the first PE, a Mesh Group to which a first PE belongs and role information of the first PE in a network service, and configure whether the Mesh Group to which the first PE belongs is a shared Mesh Group.

Specifically, if the first PE in the Mesh Group needs to establish MPLS TE tunnels with PEs in multiple Mesh Groups at the same time, the Mesh Group to which the PE belongs is configured as a shared Mesh Group; and otherwise, the Mesh Group to which the first PE belongs is configured as a non-shared Mesh Group.

Other PEs in the network also need to be configured with belonged Mesh Groups and role information in the network service, and it is also needed to configure whether their belonged Mesh Groups are shared Mesh Groups.

A procedure of configuring whether the Mesh Groups to which the other PEs belong are shared Mesh Groups is the same as that of configuring whether the Mesh Group to which the first PE belongs is a shared Mesh Group.

Reference may be made to the foregoing embodiments for description of configuring a Mesh Group to which a PE belongs and role information of the PE in the network service, which is not repeatedly described here.

It should be noted that, step 801 is an optional step in this embodiment.

Step 802: Configure, for the first PE, an attribute used by the first PE for establishing the MPLS TE tunnel.

Other PEs in the network also need to be configured with attributes used by the other PEs for establishing the MPLS TE tunnel.

It should be noted that, step 802 is an optional step in this embodiment.

Step 803: Configure, for the first PE, an attribute used by each Mesh Group on the first PE for establishing the MPLS TE tunnel, and a policy of establishing the MPLS TE tunnel by using the configured attribute.

Other PEs in the network also need to be configured with an attribute used by each Mesh Group on the other PEs for establishing the MPLS TE tunnel, and a policy of establishing the MPLS TE tunnel by using the configured attribute.

It should be noted that, step 803 is an optional step in this embodiment.

Step 804: After the first PE is configured with the Mesh Group to which the first PE belongs and the role information of the first PE in the network service, the first PE automatically releases an IGP notification message, and receives IGP notification messages released by other PEs.

In this embodiment, both the first PE and other PEs automatically release IGP notification messages, and receive the IGP messages sent by other PEs.

In this embodiment, in the IGP notification message, a Mesh Group to which a PE belongs may be indicated by using a Mesh Group number, role information of the PE in the network service may be indicated by using a corresponding role bit, and it is indicated whether the Mesh Group to which the PE belongs is a shared Mesh Group by using a shared bit, which are not limited here.

Step 805: After learning the IGP notification messages of other PEs, the first PE identifies whether the Mesh Groups to which other PEs belongs are shared Mesh Groups according to the shared bits in the IGP notification messages, and determines whether other PEs belong to the same Mesh Group with the first PE according to an identification result.

Specifically, if the first PE identifies that information of the Mesh Group to which the first PE belongs is the same as information of the Mesh Groups to which other PEs belong according to the IGP notification messages of other PEs, the first PE determines that the first PE and other PEs belong to the same Mesh Group.

If the first PE identifies that the information of the Mesh Group to which the first PE belongs is different from the information of the Mesh Groups to which other PEs belong according to the IGP notification messages of the other PEs, but the Mesh Group to which the first PE belongs and/or the Mesh Groups to which the other PEs belong is a shared Mesh Group, the first PE determines that the first PE and the other PEs belong to the same Mesh Group If the first PE identifies that the information of the Mesh Group to which the first PE belongs is different from the information of the Mesh Groups to which other PEs belong according to the IGP notification messages of the other PEs, and both the Mesh Group to which the first PE belongs and the Mesh Groups to which the other PEs belong are not shared Mesh Groups, the first PE determines that the first PE and the other PEs do not belong to the same Mesh Group.

Step 806: When the first PE identifies that the first PE and other PEs belong to the same Mesh Group, the first PE determines, according to the role information of the first PE in the network service and the role information of the other PEs belonging to the same Mesh Group in the network service, whether to establish the MPLS TE tunnel with the other PEs belonging to the same Mesh Group.

In step 806, specifically, there are different determination results in different application scenarios, and reference may be made to corresponding description in the foregoing embodiments shown in FIG. 4A to FIG. 7 for the determination results of the application scenarios.

In this embodiment, the following content may be further included.

Step 807: After establishing the MPLS TE tunnel that needs to be established, the first PE uses the attribute corresponding to the Mesh Group and the shared/exclusive tunnel policy, and trigger establishment of the MPLS TE tunnel.

Step 808: The first PE uses the MPLS TE tunnel corresponding to a Mesh Group bound with an L3VPN or L2VPN service of the first PE to bear the L3VPN or L2VPN service.

In this embodiment, the shared Mesh Group is configured, which may reduce the number of the configured Mesh Groups on the PEs and the corresponding roles, facilitate reduction of a configuration workload, and save a resource.

The IGP notification message of the foregoing embodiments may be implemented by extending a message of notifying the Mesh Group information in the prior art, and may also be implemented by defining a new message.

To support auto-discovery of an MPLS network member, RFC 4972 defines a TLV of the IGP extension, namely, a TE Mesh Group TLV, then a procedure of implementing the IGP notification message by extending the message of notifying the Mesh Group information in the prior art is mainly a procedure of extending the TE Mesh Group TLV. FIG. 9 shows a format of an IGP notification message in the ISIS protocol according to the embodiment of the present invention. As shown in FIG. 9, field information included in the IGP notification message in this embodiment is as shown in Table 1.

TABLE 1

| Field name | Field meaning |
|---|---|
| Mesh group (Mesh Group) number (mesh-group-number) | Indicate a Mesh Group to which a PE belongs |
| Tail end address (tail-end address) | Indicate an identifier of the PE belonging to the Mesh Group indicated by the Mesh Group number |
| Tail-end name (tail-end name) | Indicate a name of the PE belonging to the Mesh Group indicated by the Mesh Group number, which usually is a character string |
| Tail-end name length (name Length) | Indicate the number of bits occupied by the tail-end name |
| Shared bit (Shared mode bit, S) | Indicate whether the Mesh Group indicated by the Mesh Group number is a shared Mesh Group, for example, a value of 0 indicates no, and a value of 1 indicates yes; |
| Hub role bit (Hub Node bit, H) | Indicate whether a role of the PE is a Hub, for example, a value of 0 indicates no, and a value of 1 indicates yes |
| Spoke role bit (Spoke Node bit, S) | Indicate whether the role of the PE is a Spoke, for example, a value of 0 indicates no, and a value of 1 indicates yes |
| Border node bit (Border Node bit, B) | Indicate whether the role of the PE is a border node, for example, a value of 0 indicates no, and a value of 1 indicates yes |
| Root node bit (Root Node bit, R) | Indicate whether the role of the PE is a root node, for example, a value of 0 indicates no, and a value of 1 indicates yes |
| Leaf node bit (Leaf Node bit, L) | Indicate whether the role of the PE is a leaf node, for example, a value of 0 indicates no, and a value of 1 indicates yes |
| Ingress node bit (Ingress Node bit, I) | Indicate whether the role of the PE is an ingress node, for example, a value of 0 indicates no, and a value of 1 indicates yes |
| Egress node bit (Egress Node bit, E) | Indicate whether the role of the PE is an egress node, for example, a value of 0 indicates no, and a value of 1 indicates yes |
| Reserved bit (Reserved bit) | Reserved bit |

It may be seen from the foregoing description that, in this embodiment, the extending the Mesh Group TLV is mainly to: based on the existing information of the Mesh Group TLV, increase a bit to define whether the Mesh Group is shared and the role of the PE in the Mesh Group.

It is noted here that, in this embodiment, a new type of Mesh Group TLV needs to be extended, so as to be distinguished from an existing Mesh Group TLV. In this embodiment, the IGP distribution processing procedure of the extended Mesh Group TLV is consistent with a distribution processing procedure of the existing Mesh Group TLV defined by the RFC 4972, and is not changed.

Compatibility processing between the extended Mesh Group TLV in this embodiment and the existing Mesh Group TLV is as follows: if a mesh-group-number and tail-end address of the existing Mesh Group TLV are consistent with those of the extended Mesh Group TLV in this embodiment, the PE needs to participate in establishing an MPLS TE tunnel connection in a full connection manner defined by the existing Mesh Group TLV, and further needs to participate in establishing an MPLS TE tunnel connection in an extension manner defined by the extended Mesh Group TLV. If in the extended Mesh Group, the Mesh Group is defined as a shared Mesh Group, the PE defined in the existing Mesh Group TLV, as a shared node, establishes a Full Mesh MPLS TE tunnel connection with a PE in another Mesh Group.

For further description, in a case of a determined application scenario, the IGP notification message provided in this embodiment may only include information related to the application scenario. For example, in the Hub-Spoke scenario or the inter-domain MPLS TE scenario, the IGP notification message may not include the root node bit, the leaf node bit, the ingress node bit, the egress node bit, and the like. For another example, in the P2MP MPLS scenario, the IGP notification message may not include the Hub node bit, the Spoke node bit, the border node bit, the ingress node bit, the egress node bit, and the like.

FIG. 10 is a schematic structural diagram of a device for determining to establish an MPLS TE tunnel according to an embodiment of the present invention. As shown in FIG. 10, the device in this embodiment includes: a receiving module 1001, a determining module 1002, and a second determining module 1003.

The receiving module 1001 is configured to receive an IGP notification message released by a second device for determining to establish the MPLS TE tunnel in a network, where the IGP notification message includes information of a Mesh Group to which the second device for determining to establish the MPLS TE tunnel belongs and role information of the second device for determining to establish the MPLS TE tunnel in a network service, and the role information of the second device for determining to establish the MPLS TE tunnel in the network service is obtained by division according to an application scenario of the network service. Optionally, relative to the second device for determining to establish the MPLS TE tunnel, the device for determining to establish the MPLS TE tunnel in this embodiment shown in FIG. 10 may be referred to as a first device for determining to establish the MPLS TE tunnel. Optionally, the receiving module 1001 is a receiving interface.

The first determining module 1002 is configured to: according to information of a Mesh Group to which the device for determining to establish the MPLS TE tunnel in this embodiment belongs and the information of the Mesh Group to which the second device for determining to establish the MPLS TE tunnel belongs received by the receiving module 1001, determine whether the device for determining to establish the MPLS TE tunnel in this embodiment and the second device for determining to establish the MPLS TE tunnel belong to a same Mesh Group. Optionally, the first determining module 1002 is connected to the receiving module 1001. Optionally, the first determining module is a processor.

The second determining module 1003 is configured to: after the first determining module 1002 determines that the device for determining to establish the MPLS TE tunnel in this embodiment and the second device for determining to establish the MPLS TE tunnel belong to the same Mesh Group, determine, according to the role information of the device for determining to establish the MPLS TE tunnel in this embodiment in the network service and the role information, received by the receiving module 1001, of the second device for determining to establish the MPLS TE tunnel in the network service, whether to establish the MPLS TE tunnel to the second device for determining to establish the MPLS TE tunnel. Optionally, the second determining module 1003 is connected to the receiving module 1001 and the first determining module 1002. Optionally, the second determining module is a processor. Optionally, the first determining module and the second determining module may be the same processor. That is to say, a function of the first determining module and a function of the second determining module may be executed by different processors, and may also be executed by the same processor.

The second device for determining to establish the MPLS TE tunnel refers to one or more of other devices for determining to establish an MPLS TE tunnel in the network except the device for determining to establish the MPLS TE tunnel in this embodiment. The device for determining to establish the MPLS TE tunnel in this embodiment may be a PE or P device in an MPLS VPN network.

The application scenario of the network service in this embodiment may be a Hub-Spoke scenario, a P2MP MPLS scenario, a unidirectional MPLS scenario, an inter-domain MPLS TE scenario, and so on. In the Hub-Spoke scenario, the role information includes a Hub node and a Spoke node. In the Hub-Spoke scenario, the MPLS TE tunnel is only allowed to be established between the Hub node and the Spoke node, and the MPLS TE tunnel is not allowed not be established between Hub nodes or between Spoke nodes. In the P2MP MPLS scenario, the role information includes a root node and a leaf node. In the P2MP MPLS scenario, a root node establishes a P2MP MPLS TE tunnel with multiple leaf nodes. The unidirectional MPLS scenario refers to a scenario where the MPLS TE tunnel can only be established from a device for determining to establish an MPLS TE tunnel to another device for determining to establish an MPLS TE tunnel, but the MPLS TE tunnel cannot be established in a reverse direction. In the unidirectional MPLS scenario, the role information of the PE includes an ingress node and an egress node; and the MPLS TE tunnel can only be established in a direction from the ingress node to the egress node. The inter-domain MPLS TE scenario refers to that an IGP multi-process or multi-area technology is used for network division, so that devices for determining to establish an MPLS TE tunnel that need to establish the MPLS TE tunnel locate in different IGP processes or areas. In the inter-domain MPLS TE scenario, the role information further includes an inter-domain border node. The inter-domain MPLS TE scenario may be combined with the Hub-Spoke scenario, the P2MP MPLS scenario, or the unidirectional MPLS scenario, so a role in the inter-domain MPLS TE scenario, in addition to including the Hub node and Spoke node, or in addition to including the root node and leaf node, or in addition to including the ingress node and egress node, further includes the inter-domain border node (Border), that is, the border node is on two IGP processes or areas.

The functional modules of the device for determining to establish the MPLS TE tunnel provided in this embodiment may be used to execute the procedure of the method for establishing the MPLS TE tunnel shown in FIG. 1, and reference is made to the description of the method embodiment for a specific working principle, which is not repeatedly described here.

When releasing the information of the Mesh Group to which the device for determining to establish the MPLS TE tunnel in this embodiment belongs, the device for determining to establish the MPLS TE tunnel in this embodiment releases its role information in the network service at the same time, and each device for determining to establish an MPLS TE tunnel determines, according to both information of Mesh Groups to which each device for determining to establish the MPLS TE tunnel and another device for determining to establish the MPLS TE tunnel belong and role information of each device for determining to establish the MPLS TE tunnel and the another device for determining to establish the MPLS TE tunnel in the network service, whether to establish the MPLS TE tunnel to the another device for determining to establish an MPLS TE tunnel, which ensures that the MPLS TE tunnel is established between the devices for determining to establish the MPLS TE tunnel that need to establish the MPLS TE tunnel, and the MPLS TE tunnel is not established between the devices for determining to establish the MPLS TE tunnel that do not need not to establish the MPLS TE tunnel, overcomes a limitation in establishing the MPLS TE tunnel by using a Mesh Group solution, and saves a resource consumed due to establishing an unnecessary MPLS TE tunnel.

Figure 11:
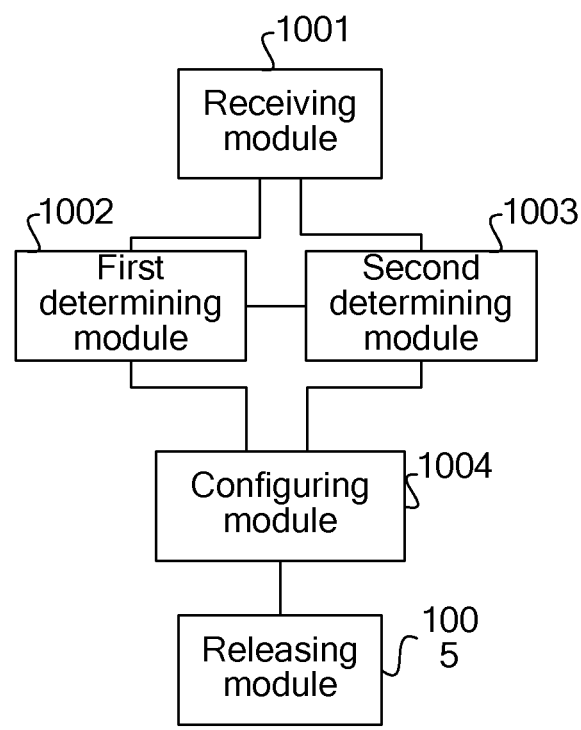
FIG. 11 is a schematic structural diagram of a device for determining to establish an MPLS TE tunnel according to another embodiment of the present invention.

FIG. 11 is a schematic structural diagram of a device for determining to establish an MPLS TE tunnel according to another embodiment of the present invention. This embodiment is implemented based on the embodiment shown in FIG. 10. In this embodiment, for different application scenarios of network services, the function of the second determining module 1003 is not completely the same.

For a Hub-Spoke scenario, role information of the device for determining to establish the MPLS TE tunnel in this embodiment in the network service may be a Hub node or a Spoke node, and role information of a second device for determining to establish an MPLS TE tunnel in the network service may be a Hub node or a Spoke node. The second determining module 1003 in this embodiment is specifically configured to: after determining that the role information of the device for determining to establish the MPLS TE tunnel in this embodiment in the network service is different from the role information of the second device for determining to establish the MPLS TE tunnel in the network service, determine to establish the MPLS TE tunnel to the second device for determining to establish the MPLS TE tunnel. The second determining module 1003 in this embodiment is further specifically configured to: after determining that the role information of the device for determining to establish the MPLS TE tunnel in this embodiment in the network service is the same as the role information of the second device for determining to establish the MPLS TE tunnel in the network service, determine not to establish the MPLS TE tunnel to the second device for determining to establish the MPLS TE tunnel.

For a P2MP MPLS scenario, the role information of the device for determining to establish the MPLS TE tunnel in this embodiment in the network service may be a root node or a leaf node, and the role information of the second device for determining to establish the MPLS TE tunnel in the network service may be a root node or a leaf node. The second determining module 1003 in this embodiment is specifically configured to: after determining that the role information of the device for determining to establish the MPLS TE tunnel in this embodiment in the network service is a root node, and the role information of the second device for determining to establish the MPLS TE tunnel in the network service is a leaf node, determine to establish a P2MP MPLS TE tunnel to the second device for determining to establish the MPLS TE tunnel. The second determining module 1003 in this embodiment is further specifically configured to determine not to establish the P2MP MPLS TE tunnel to the second device for determining to establish the MPLS TE tunnel, after determining that the role of the device for determining to establish the MPLS TE tunnel in this embodiment is a leaf node, or after determining that the role information of both the device for determining to establish the MPLS TE tunnel in this embodiment and the second device for determining to establish the MPLS TE tunnel in the network service is a root node.

For a unidirectional MPLS scenario, the role information of the device for determining to establish the MPLS TE tunnel in this embodiment in the network service may be an ingress node or an egress node, and the role information of the second device for determining to establish the MPLS TE tunnel in the network service may be an ingress node or an egress node. The second determining module 1003 in this embodiment is specifically configured to: after determining that the role information of the device for determining to establish the MPLS TE tunnel in this embodiment in the network service is an ingress node, and the role information of the second device for determining to establish the MPLS TE tunnel in the network service is an egress node, determine to establish the MPLS TE tunnel to the second device for determining to establish the MPLS TE tunnel. The second determining module 1003 in this embodiment is further specifically configured to: after determining that the role of the device for determining to establish the MPLS TE tunnel in this embodiment in the network service is an ingress node, or after determining that the role information of both the device for determining to establish the MPLS TE tunnel in this embodiment and the second device for determining to establish the MPLS TE tunnel in the network service is an ingress node, determine not to establish the MPLS TE tunnel to the second device for determining to establish the MPLS TE tunnel.

For an inter-domain MPLS TE scenario, the second determining module 1003 in this embodiment is further specifically configured to, after determining to establish the MPLS TE tunnel to the second device for determining to establish the MPLS TE tunnel, select a device whose role information is a border node from a Mesh Group to which the device for determining to establish the MPLS TE tunnel in this embodiment belongs, establish a path to the device whose role information is the border node, and trigger that the device whose role information is the border node establishes a path to the second device for determining to establish the MPLS TE tunnel, so as to complete establishing the MPLS TE tunnel to the second device for determining to establish the MPLS TE tunnel.

Further, a role of the border node may further be divided into a master border node and a backup border node. Based on this, the second determining module 1003 is specifically configured to select a device whose role information is a master border node from the Mesh Group to which the device for determining to establish the MPLS TE tunnel in this embodiment belongs, establish a path to the selected device whose role information is the master border node, and trigger that the selected device whose role is the master border node establishes a path to the second device for determining to establish the MPLS TE tunnel, so as to complete establishing a master MPLS TE tunnel to the second device for determining to establish the MPLS TE tunnel. And/or, the second determining module 1003 is specifically configured to select a device whose role information is a backup border node from the Mesh Group to which the device for determining to establish the MPLS TE tunnel in this embodiment belongs, establish a path to the selected device whose role information is the backup border node, and trigger that the selected device whose role information is the backup border node establishes a path to the second device for determining to establish the MPLS TE tunnel, so as to complete establishing a backup MPLS TE tunnel to the second device for determining to establish the MPLS TE tunnel.

The device whose role information is the border node in the network service may be a PE, and may also be a P device.

For various application scenarios, reference may be made to the corresponding description of the method embodiments shown in FIG. 1 to FIG. 8 for functions of the foregoing second determining module 1003, which are not repeatedly described here.

Further, as shown in FIG. 11, the device for determining to establish the MPLS TE tunnel in this embodiment further includes a configuring module 1004.

The configuring module 1004 is configured to: according to the application scenario of the network service, configure the information of the belonged Mesh Group and the role information in the network service for the device for determining to establish the MPLS TE tunnel in this embodiment belongs. Optionally, the configuring module may be a processor executing a configuration function, where the processor executing the configuration function may be a processor the same as a processor of the first determining module and/or the second determining module, and may also be a different processor.

Further, the device in this embodiment further includes a releasing module 1005. The releasing module 1005 is configured to release, to the second device for determining to establish the MPLS TE tunnel (that is, to another device in the network), an IGP notification message of the information of the Mesh Group to which the device for determining to establish the MPLS TE tunnel in this embodiment belongs and the role information of the device for determining to establish the MPLS TE tunnel in this embodiment in the network service, so that the second device for determining to establish the MPLS TE tunnel, after determining that the device for determining to establish the MPLS TE tunnel in this embodiment and the second device for determining to establish the MPLS TE tunnel belong to the same Mesh Group according to the information of the Mesh Group to which the device for determining to establish the MPLS TE tunnel in this embodiment belongs and the information of a Mesh Group to the second device for determining to establish the MPLS TE tunnel belongs determines, according to the role information of the device for determining to establish the MPLS TE tunnel in this embodiment in the network service and the role information of the second device for determining to establish the MPLS TE tunnel in the network service, whether to establish the MPLS TE tunnel to the device for determining to establish the MPLS TE tunnel in this embodiment. Optionally, the releasing module may be a sending interface. The sending interface and the receiving interface may be a same physical interface, and may also be different physical interfaces.

Further, the configuring module 1004 in this embodiment is further configured to configure whether the Mesh Group to which the device for determining to establish the MPLS TE tunnel in this embodiment belongs to a shared Mesh Group. Based on this, IGP notification messages released by the device for determining to establish the MPLS TE tunnel in this embodiment and the second device for determining to establish the MPLS TE tunnel further include information about whether the belonged Mesh Groups belong to shared Mesh Groups.

Based on the foregoing description, the first determining module 1002 is specifically configured to: when the information of the Mesh Group to which the device for determining to establish the MPLS TE tunnel in this embodiment belongs is the same as the information of the Mesh Group to which the second device for determining to establish the MPLS TE tunnel belongs, or when the information of the Mesh Group to which the device for determining to establish the MPLS TE tunnel in this embodiment belongs is different from the information of the Mesh Group to which the second device for determining to establish the MPLS TE tunnel belongs but the Mesh Group to which the device for determining to establish the MPLS TE tunnel in this embodiment belongs and/or the Mesh Group to which the second device for determining to establish the MPLS TE tunnel belongs is a shared Mesh Group, determine that the device for determining to establish the MPLS TE tunnel in this embodiment and the second device for determining to establish the MPLS TE tunnel belong to the same Mesh Group. The first determining module 1002 is further specifically configured to: when the information of the Mesh Group to which the device for determining to establish the MPLS TE tunnel in the embodiment belongs is different from the information of the Mesh Group to which the second device for determining to establish the MPLS TE tunnel belongs, and neither the Mesh Group to which the device for determining to establish the MPLS TE tunnel in this embodiment belongs nor the Mesh Group to which the second device for determining to establish the MPLS TE tunnel belongs is a shared Mesh Groups, determine that the device for determining to establish the MPLS TE tunnel in this embodiment and the second device for determining to establish the MPLS TE tunnel do not belong to the same Mesh Group.

Further, when the information of the Mesh Group to which the device for determining to establish the MPLS TE tunnel in this embodiment belongs and/or the role information of the device for determining to establish the MPLS TE tunnel in this embodiment in the network service changes, the releasing module 1005 re-releases an IGP notification message to the second device for determining to establish the MPLS TE tunnel, so that the second device for determining to establish the MPLS TE tunnel re-determines whether to establish the MPLS TE tunnel to the device for determining to establish the MPLS TE tunnel in this embodiment.

Accordingly, when the information of the Mesh Group to which the second device for determining to establish the MPLS TE tunnel belongs and/or the role information of the second device for determining to establish the MPLS TE tunnel in the network service changes, a releasing module of the second device for determining to establish the MPLS TE tunnel also re-releases an IGP notification message to another device for determining to establish an MPLS TE tunnel. Based on this, the receiving module 1001 of the device for determining to establish the MPLS TE tunnel in this embodiment is further configured to receive the IGP notification message released by the second device for determining to establish the MPLS TE tunnel when the information of the Mesh Group to which the second device for determining to establish the MPLS TE tunnel belongs and/or the role information of the second device for determining to establish the MPLS TE tunnel in the network service changes, so that the first determining module 1002 and the second determining module 1003 re-determine whether to establish the MPLS TE tunnel to the second device for determining to establish the MPLS TE tunnel.

The foregoing functional modules in this embodiment may be used to execute the corresponding procedures of the method embodiments shown in FIG. 1 to FIG. 8, and reference is made to the description of the method embodiments for a specific working principle, which is not repeatedly described here.

When releasing the information of the Mesh Group to which the device for determining to establish the MPLS TE tunnel in this embodiment belongs, the device for determining to establish the MPLS TE tunnel in this embodiment releases its role information in the network service at the same time, and each device for determining to establish an MPLS TE tunnel determines, according to both information of Mesh Groups to which each device for determining to establish the MPLS TE tunnel and another device for determining to establish the MPLS TE tunnel belong and role information of each device for determining to establish the MPLS TE tunnel and the another device for determining to establish the MPLS TE tunnel in the network service, whether to establish the MPLS TE tunnel to the another device for determining to establish an MPLS TE tunnel, which ensures that the MPLS TE tunnel is established between the devices for determining to establish the MPLS TE tunnel that need to establish the MPLS TE tunnel, and the MPLS TE tunnel is not established between the devices for determining to establish the MPLS TE tunnel that do not need not to establish the MPLS TE tunnel, overcomes a limitation in establishing the MPLS TE tunnel by using a Mesh Group solution, and saves a resource consumed due to establishing an unnecessary MPLS TE tunnel.

Optionally, in the present invention, "A and/or B" may be an "A", may be a "B", and may further be "A and B".

Persons of ordinary skill in the art may understand that all or part of the steps of the method embodiments may be implemented by a program instructing relevant hardware. The foregoing program may be stored in a computer readable storage medium. When the program is executed, the steps of the foregoing methods embodiments are executed. The storage medium includes: various media that may store program codes, such as a ROM, a RAM, a magnetic disk, or a compact disk and so on.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiment, or make equivalent substitutions to some or all the technical features, where such modifications or substitutions do not make the nature of corresponding technical solutions depart from the scope of the technical solutions of the embodiments of the present invention.

What is claimed is:

1. A method for establishing a multi-protocol label switching traffic engineering (MPLS TE) tunnel, comprising:

receiving, by a first provider edge (PE), an interior gateway protocol (IGP) notification message released by a second PE in a network, wherein the IGP notification message comprises information of a Mesh Group to which the second PE belongs and role information of the second PE in a network service, and the role information of the second PE in the network service is determined according to an application scenario of the network service, wherein the application scenario of the network service is one of the following: a hub-spoke scenario, a point-to-multipoint (P2MP) MPLS scenario, and a unidirectional MPLS scenario, and wherein the respective role information is a Hub node or a Spoke node when the application scenario of the network service is the hub-spoke scenario; wherein the respective role information is a root node or a leaf node when the application scenario of the network service is the P2MP MPLS scenario; and wherein the respective role information is the ingress node or an egress node when the application scenario of the network service is a unidirectional MPLS scenario;

determining, by the first PE according to information of a Mesh Group to which the first PE belongs and the information of the Mesh Group to which the second PE belongs, whether the first PE and the second PE belong to a same Mesh Group;

after determining that the first PE and the second PE belong to the same Mesh Group, determining, by the first PE according to role information of the first PE in the network service and the role information of the second PE in the network service, whether to establish the MPLS TE tunnel to the second PE, wherein the role information of the first PE in the network service is determined according to the application scenario of the network service; and receiving, by the first PE, an IGP notification message re-sent by the second PE when the information of the Mesh Group to which the second PE belongs or the role information of the second PE in the network service changes, and re-determining whether to establish the MPLS TE tunnel to the second PE.

2. The method for establishing the MPLS TE tunnel according to claim 1, wherein
the application scenario of the network service is the hub-spoke scenario, the role information of the first PE in the network service is the Hub node or the Spoke node, and the role information of the second PE in the network service is the Hub node or the Spoke node; and
the method further comprises:
after determining that the role information of the first PE in the network service is different from the role information of the second PE in the network service, determining, by the first PE, to establish the MPLS TE tunnel to the second PE; and
after determining that the role information of the first PE in the network service is the same as the role information of the second PE in the network service, determining, by the first PE, not to establish the MPLS TE tunnel to the second PE.

3. The method for establishing the MPLS TE tunnel according to claim 2, wherein
the application scenario of the network service is an inter-domain MPLS TE scenario; and after the first PE determines to establish the MPLS TE tunnel to the second PE, the method comprises:
selecting, by the first PE, a device whose role information is a border node from the Mesh Group to which the first PE belongs, establishing a path to the selected device whose role information is the border node, and triggering that the selected device whose role information is the border node establishes a path to the second PE, so as to complete establishing the MPLS TE tunnel to the second PE.

4. The method for establishing the MPLS TE tunnel according to claim 3, wherein the border node comprises a master border node and a backup border node; and the method further comprises:
selecting, by the first PE, the device whose role information is the master border node from the Mesh Group to which the first PE belongs, establishing the path to the selected device whose role information is the master border node, and triggering that the selected device whose role information is the master border node establishes the path to the second PE, so as to complete establishing a master MPLS TE tunnel to the second PE;
selecting, by the first PE, the device whose role information is a backup border node from the Mesh Group to which the first PE belongs, establishing the path to the selected device whose role information is the backup border node, and triggering that the selected device whose role information is the backup border node establishes the path to the second PE, so as to complete establishing a backup MPLS TE tunnel to the second PE.

5. The method for establishing the MPLS TE tunnel according to claim 1, wherein
the application scenario of the network service is the P2MP MPLS scenario, the role information of the first PE in the network service is the root node or the leaf node, and the role information of the second PE in the network service is the root node or the leaf node; and
the method further comprises:
after determining that the role information of the first PE in the network service is the root node, and the role information of the second PE in the network service is the leaf node, determining, by the first PE, to establish a P2MP MPLS TE tunnel to the second PE; and
after determining that the role information of the first PE in the network service is the leaf node, or after determining that the role information of both the first PE and the second PE in the network service is the root node, determining, by the first PE, not to establish the P2MP MPLS TE tunnel to the second PE.

6. The method for establishing the MPLS TE tunnel according to claim 1, wherein
the application scenario of the network service is the unidirectional MPLS scenario, the role information of the first PE in the network service is the ingress node or the egress node, and the role information of the second PE in the network service is the ingress node or the egress node; and
the method further comprises:
after determining that the role information of the first PE in the network service is the ingress node, and the role information of the second PE in the network service is the egress node, determining, by the first PE, to establish the MPLS TE tunnel to the second PE; and
after determining that the role information of the first PE in the network service is the egress node, or after determining that the role information of both the first PE and the second PE in the network service is the ingress node, determining, by the first PE, not to establish the MPLS TE tunnel to the second PE.

7. The method for establishing the MPLS TE tunnel according to claim 1, wherein before the receiving, by the first provider edge PE, the interior gateway protocol (IGP) notification message released by the second PE in the network, the method comprises:
configuring the information of the Mesh Group to which the first PE belongs and the role information of the first PE in the network service for the first PE according to the application scenario of the network service.

8. The method for establishing the MPLS TE tunnel according to claim 1, further comprising:
releasing, by the first PE, the IGP notification message comprising the information of the Mesh Group to which the first PE belongs and the role information of the first PE in the network service to the second PE, so that the second PE, after determining that the first PE and the second PE belong to the same Mesh Group according to the information of the Mesh Group to which the first PE belongs and the information of the Mesh Group to which the second PE belongs, determines, according to the role information of the first PE in the network service and the role information of the second PE in the network service, whether to establish the MPLS TE tunnel to the first PE.

9. The method for establishing the MPLS TE tunnel according to claim 1, wherein the IGP notification message further comprises information about whether the Mesh Group to which the second PE belongs is a shared Mesh Group; and the method further comprises:
determining, by the first PE, that the first PE and the second PE belong to the same Mesh Group, if the information of the Mesh Group to which the first PE belongs is the same as the information of the Mesh Group to which the second PE belongs;
determining, by the first PE, that the first PE and the second PE belong to the same Mesh Group, if the information of the Mesh Group to which the first PE belongs is different from the information of the Mesh Group to which the second PE belongs, but the Mesh Group to which the first PE belongs the Mesh Group to which the second PE belongs is the shared Mesh Group; and
determining, by the first PE, that the first PE and the second PE do not belong to the same Mesh Group, if the information of the Mesh Group to which the first PE belongs is different from the information of the Mesh Group to which the second PE belongs, and neither the Mesh Group to which the first PE belongs nor the Mesh Group to which the second PE belongs is the shared Mesh Group.

10. A device for establishing a multi-protocol label switching traffic engineering (MPLS TE) tunnel, comprising:
a receiver, configured to receive an interior gateway protocol (IGP) notification message released by a second device in the network for determining to establish an MPLS TE tunnel, wherein the IGP notification message comprises information of a Mesh Group to which the second device for determining to establish the MPLS TE tunnel belongs and role information of the second device in the network service for determining to establish the MPLS TE tunnel, and the role information of the second device for determining to establish the MPLS TE tunnel in the network service is determined according to an application scenario of the network service, wherein the application scenario of the network service is one of the following: a hub-spoke scenario, a point-to-multipoint (P2MP) MPLS scenario, and a unidirectional MPLS scenario, and wherein the respective role information is a Hub node or a Spoke node when the application scenario of the network service is the hub-spoke scenario; wherein the respective role information is a root node or a leaf node when the application scenario of the network service is the P2MP MPLS scenario; and wherein the respective role information is the ingress node or an egress node when the application scenario of the network service is a unidirectional MPLS scenario;
a processor, configured to determine, according to information of a Mesh Group to which the device for determining to establish the MPLS TE tunnel belongs and the information of the Mesh Group to which the second device for determining to establish the MPLS TE tunnel belongs, whether the device for determining to establish the MPLS TE tunnel and the second device for determining to establish the MPLS TE tunnel belong to a same Mesh Group; and
the processor, further configured to determine according to role information of the device in the network service for determining to establish the MPLS TE tunnel and the role information of the second device in the network service for determining to establish the MPLS TE tunnel, after the processor determines that the device for determining to establish the MPLS TE tunnel and the second device for determining to establish the MPLS TE tunnel belong to the same Mesh Group, whether to establish the MPLS TE tunnel to the second device for determining to establish the MPLS TE tunnel, wherein the role information of the device for determining to establish the MPLS TE tunnel in the network service is determined according to the application scenario of the network service, wherein the receiver is further configured to receive an IGP notification message re-sent by the second device for determining to establish the MPLS TE tunnel when the information of the Mesh Group to which the second device for determining to establish the MPLS TE tunnel belongs or the role information of the second device for determining to establish the MPLS TE tunnel in the network service changes, so that the processor re-determines whether to establish the MPLS TE tunnel to the second device for determining to establish the MPLS TE tunnel.

11. The device for establishing the MPLS TE tunnel according to claim 10, wherein
the application scenario of the network service is the hub-spoke scenario, the role information of the device for determining to establish the MPLS TE tunnel in the network service is the Hub node or the Spoke node, and the role information of the second device for determining to establish the MPLS TE tunnel in the network service is the Hub node or the Spoke node;
the processor is specifically configured to: after determining that the role information of the device for determining to establish the MPLS TE tunnel in the network service is different from the role information of the second device for determining to establish the MPLS TE tunnel in the network service, determine to establish the MPLS TE tunnel to the second device for determining to establish the MPLS TE tunnel; and
the processor is further specifically configured to: after determining that the role information of the device for determining to establish the MPLS TE tunnel in the network service is the same as the role information of the second device for determining to establish the MPLS TE tunnel in the network service, determine not to establish the MPLS TE tunnel to the second device for determining to establish the MPLS TE tunnel.

12. The device for establishing the MPLS TE tunnel according to claim 11, wherein:
the application scenario of the network service is an inter-domain MPLS TE scenario; and
the processor is specifically configured to: after determining to establish the MPLS TE tunnel to the second device for determining to establish the MPLS TE tunnel, select a device whose role information is a border node from the Mesh Group to which the device for determining to establish the MPLS TE tunnel belongs, establish a path to the device whose role information is the border node, and trigger that the device whose role information is the border node establishes a path to the second device for determining to establish the MPLS TE tunnel, so as to complete establishing the MPLS TE tunnel to the second device for determining to establish the MPLS TE tunnel.

13. The device for establishing the MPLS TE tunnel according to claim 12, wherein the border node comprises a master border node and a backup border node;

the processor is specifically configured to select the device whose role information is the master border node from the Mesh Group to which the device for determining to establish the MPLS TE tunnel belongs, establish the path to the selected device whose role information is the master border node, and trigger that the selected device whose role information is the master border node establishes the path to the second device for determining to establish the MPLS TE tunnel, so as to complete establishing a master MPLS TE tunnel to the second device for determining to establish the MPLS TE tunnel; or the processor is specifically configured to select the device whose role information is the backup border node from the Mesh Group to which the device for determining to establish the MPLS TE tunnel belongs, establish the path to the selected device whose role information is the backup border node, and trigger that the selected device whose role information is the backup border node establishes the path to the second device for determining to establish the MPLS TE tunnel, so as to complete establishing a backup MPLS TE tunnel to the second device for determining to establish the MPLS TE tunnel.

14. The device for establishing the MPLS TE tunnel according to claim 10, wherein the application scenario of the network service is the P2MP MPLS scenario, the role information of the device in the network service for determining to establish the MPLS TE tunnel is the root node or the leaf node, and the role information of the second device in the network service for determining to establish the MPLS TE tunnel is the root node or the leaf node;

the processor is specifically configured to: after determining that the role information of the device in the network service for determining to establish the MPLS TE tunnel is a root node, and the role information of the second device in the network service for determining to establish the MPLS TE tunnel is a leaf node, determine to establish a P2MP MPLS TE tunnel to the second device for determining to establish the MPLS TE tunnel; and the processor is further specifically configured to: after determining that the role of the device in the network service for determining to establish the MPLS TE tunnel is the leaf node, or after determining that the role information of both the device for determining to establish the MPLS TE tunnel and the second device in the network service for determining to establish the MPLS TE tunnel is the root node, determine not to establish the P2MP MPLS TE tunnel to the second device for determining to establish the MPLS TE tunnel.

15. The device for establishing the MPLS TE tunnel according to claim 10, wherein:

the application scenario of the network service is the unidirectional MPLS scenario, the role information of the device in the network service for determining to establish the MPLS TE tunnel is the ingress node or the egress node, and the role information of the second device in the network service for determining to establish the MPLS TE tunnel is the ingress node or the egress node;

the processor is specifically configured to: after determining that the role information of the device in the network service for determining to establish the MPLS TE tunnel is the ingress node, and the role information of the second device in the network service for determining to establish the MPLS TE tunnel in the network service is the egress node, determine to establish the MPLS TE tunnel to the second device for determining to establish the MPLS TE tunnel; and the processor is further specifically configured to: after determining that the role of the device in the network service for determining to establish the MPLS TE tunnel is the egress node, or after determining that the role information of both the device for determining to establish the MPLS TE tunnel and the second device in the network service for determining to establish the MPLS TE tunnel is the ingress node, determine not to establish the MPLS TE tunnel to the second device for determining to establish the MPLS TE tunnel.

16. The device for establishing the MPLS TE tunnel according to claim 10, wherein:

the processor is further configured to: according to the application scenario of the network service, configure information of the belonged Mesh Group and the role information in the network service for the device for determining to establish the MPLS TE tunnel.

17. The device for establishing the MPLS TE tunnel according to claim 10, further comprising:

a transmitter, configured to release the IGP notification message, which includes the information of the Mesh Group to which the device for determining to establish the MPLS TE tunnel belongs and the role information of the device in the network service for determining to establish the MPLS TE tunnel, to the second device for determining to establish the MPLS TE tunnel, so that the second device for determining to establish the MPLS TE tunnel, after determining, according to the information of the Mesh Group to which the device for determining to establish the MPLS TE tunnel belongs and the information of the Mesh Group to which the second device for determining to establish the MPLS TE tunnel belongs, that the device for determining to establish the MPLS TE tunnel and the second device for determining to establish the MPLS TE tunnel belong to the same Mesh Group, determines, according to the role information of the device in the network service for determining to establish the MPLS TE tunnel and the role information of the second device in the network service for determining to establish the MPLS TE tunnel, whether to establish the MPLS TE tunnel to the device for determining to establish the MPLS TE tunnel.

18. The device for establishing the MPLS TE tunnel according to claim 10, wherein the processor is specifically configured to: when the information of the Mesh Group to which the device for determining to establish the MPLS TE tunnel belongs is the same as the information of the Mesh Group to which the second device for determining to establish the MPLS TE tunnel belongs, or when the information of the Mesh Group to which the device for determining to establish the MPLS TE tunnel belongs is different from the information of the Mesh Group to which the second device for determining to establish the MPLS TE tunnel but the Mesh Group to which the device for determining to establish the MPLS TE tunnel belongs or the Mesh Group to which the second device for determining to establish the MPLS TE tunnel belongs is a shared Mesh Group, determine that the device for determining to establish the MPLS TE tunnel and the second device for determining to establish the MPLS TE tunnel belong to the same Mesh Group;

the processor is further specifically configured to: when the information of the Mesh Group to which the device for determining to establish the MPLS TE tunnel belongs is different from the information of the Mesh Group to which the second device for determining to establish the MPLS TE tunnel belongs, and neither the Mesh Group to which the device for determining to establish the MPLS TE tunnel in this embodiment belongs nor the Mesh Group to which the second device for determining to establish the MPLS TE tunnel belongs is the shared Mesh Group, determine that the device for determining to establish the MPLS TE tunnel and the second device for determining to establish the MPLS TE tunnel do not belong to the same Mesh Group.

* * * * *